United States Patent
Gardiner et al.

(10) Patent No.: US 7,852,570 B2
(45) Date of Patent: Dec. 14, 2010

(54) OPTICAL FILM HAVING A SET OF DIFFRACTIVE FEATURES RANDOMLY REPEATING AT VARIABLE DISTANCES

(75) Inventors: Mark E. Gardiner, Santa Rosa, CA (US); Jeffrey E. Clements, Oakdale, MN (US); Mark R. Dupre, Oakdale, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 12/436,156

(22) Filed: May 6, 2009

(65) Prior Publication Data

US 2009/0220745 A1    Sep. 3, 2009

Related U.S. Application Data

(62) Division of application No. 11/620,093, filed on Jan. 5, 2007, now Pat. No. 7,628,100.

(51) Int. Cl.
    *G02B 13/20*    (2006.01)
(52) U.S. Cl. .................. 359/707; 359/530
(58) Field of Classification Search ............ 359/707, 359/530, 831, 900
    See application file for complete search history.

(56) References Cited

U.S. PATENT DOCUMENTS 2,404,222 A    7/1946  Doner
2,738,730 A    3/1956  Boyajean
3,293,727 A    12/1966 Simms
3,417,959 A    12/1968 Schultz
4,012,843 A    3/1977  Harada et al.
4,035,590 A    7/1977  Halter
4,417,489 A    11/1983 Liu
4,488,840 A    12/1984 Pollington
4,986,150 A    1/1991  Okazaki
5,007,709 A    4/1991  Iida et al.
5,193,014 A    3/1993  Takenouchi et al.
5,239,736 A    8/1993  Sliwa, Jr. et al.
5,291,812 A    3/1994  Yen et al.

(Continued)

FOREIGN PATENT DOCUMENTS

JP    63-180401    7/1988

(Continued)

OTHER PUBLICATIONS

UltraMill Research@PEC,NCSU, "Vibration Assisted Machining: Ultramill," North Carolina State University Precision Engineering Center, Raleigh, NC 27695, [http://airy.pec.ncsu.edu/PEC/research/projects/ultramill/index.html], Spring 2000, pp. 2.

(Continued)

*Primary Examiner*—Timothy J Thompson

(57) ABSTRACT

A cutting tool assembly having a tool post capable of lateral movement along a work piece to be cut and an actuator with at least one machined tool tip and possibly other tool tips. The actuator provides for control of the movement of the tool tip in an x-direction into and out of the work piece in order to make continuous or discontinuous diffractive features in it. The machined work piece can be used to make articles having diffractive features such as optical films having lenslets.

2 Claims, 17 Drawing Sheets

U.S. PATENT DOCUMENTS

| | | | |
|---|---|---|---|
| 5,467,675 A | 11/1995 | Dow et al. |
| 5,600,455 A | 2/1997 | Ishikawa et al. |
| 5,663,802 A | 9/1997 | Beckett et al. |
| 5,719,339 A | 2/1998 | Hartman et al. |
| 5,801,889 A | 9/1998 | Meyers et al. |
| 5,877,431 A | 3/1999 | Hirano |
| 5,877,432 A | 3/1999 | Hartman et al. |
| 6,040,653 A | 3/2000 | O'Neill |
| 6,170,367 B1 | 1/2001 | Keller et al. |
| 6,237,452 B1 | 5/2001 | Ludwick et al. |
| 6,253,422 B1 | 7/2001 | Zipp |
| 6,322,236 B1 | 11/2001 | Campbell et al. |
| 6,328,504 B1 | 12/2001 | Kinukawa |
| 6,354,709 B1 | 3/2002 | Campbell et al. |
| 6,356,391 B1 | 3/2002 | Gardiner et al. |
| 6,386,855 B1 | 5/2002 | Luttrell et al. |
| 6,487,017 B1 | 11/2002 | Gunn et al. |
| 6,560,026 B2 | 5/2003 | Gardiner et al. |
| 6,570,710 B1 | 5/2003 | Nilsen et al. |
| 6,581,286 B2 | 6/2003 | Campbell et al. |
| 6,585,461 B1 | 7/2003 | Saito |
| 6,597,968 B2 | 7/2003 | Matsumoto et al. |
| 6,618,106 B1 | 9/2003 | Gunn et al. |
| 6,655,654 B1 | 12/2003 | Cotton, III et al. |
| 6,665,027 B1 | 12/2003 | Gunn et al. |
| 6,707,611 B2 | 3/2004 | Gardiner et al. |
| 6,739,575 B2 | 5/2004 | Cotton, III et al. |
| 6,752,505 B2 | 6/2004 | Parker et al. |
| 6,791,764 B2 | 9/2004 | Hosoe |
| 6,811,274 B2 | 11/2004 | Olczak |
| 6,839,173 B2 | 1/2005 | Shimmo et al. |
| 6,844,950 B2 | 1/2005 | Ja Chisholm et al. |
| 6,845,212 B2 | 1/2005 | Gardiner et al. |
| 6,861,649 B2 | 3/2005 | Massie |
| 6,862,141 B2 | 3/2005 | Olczak |
| 6,909,482 B2 | 6/2005 | Olczak |
| 6,925,915 B1 | 8/2005 | Claesson et al. |
| 6,951,400 B2 | 10/2005 | Chisholm et al. |
| 6,952,627 B2 | 10/2005 | Olczak et al. |
| 6,965,476 B2 | 11/2005 | Sato |
| 7,009,774 B2 | 3/2006 | Yoshikawa et al. |
| 7,107,694 B2 | 9/2006 | Yang et al. |
| 7,140,812 B2 | 11/2006 | Bryan et al. |
| 7,145,282 B2 | 12/2006 | Oakley et al. |
| 7,248,412 B2 | 7/2007 | Olczak |
| 7,290,471 B2 | 11/2007 | Ehnes et al. |
| 7,293,487 B2 | 11/2007 | Campbell et al. |
| 7,298,554 B2 | 11/2007 | Cho et al. |
| 7,328,638 B2 | 2/2008 | Gardiner et al. |
| 7,364,314 B2 * | 4/2008 | Nilsen et al. | 359/530 |
| 2002/0035231 A1 | 3/2002 | Whitehouse et al. |
| 2002/0154669 A1 | 10/2002 | Spangler et al. |
| 2003/0035231 A1 | 2/2003 | Epstein et al. |
| 2003/0108710 A1 | 6/2003 | Coyle et al. |
| 2003/0112521 A1 | 6/2003 | Gardiner et al. |
| 2003/0223830 A1 | 12/2003 | Bryan et al. |
| 2003/0226991 A1 | 12/2003 | Cotton, III et al. |
| 2004/0035266 A1 | 2/2004 | Montesanti et al. |
| 2004/0045419 A1 | 3/2004 | Bryan et al. |
| 2004/0069944 A1 | 4/2004 | Massie |
| 2004/0109663 A1 | 6/2004 | Olczak |
| 2004/0135273 A1 | 7/2004 | Parker et al. |
| 2005/0024849 A1 | 2/2005 | Parker et al. |
| 2005/0025423 A1 | 2/2005 | Hanaoka et al. |
| 2005/0073220 A1 | 4/2005 | Moler |
| 2005/0223858 A1 | 10/2005 | Lu et al. |
| 2006/0055627 A1 | 3/2006 | Wilson |
| 2006/0120816 A1 | 6/2006 | Morimoto et al. |
| 2006/0234605 A1 | 10/2006 | Bryan et al. |
| 2007/0097492 A1 | 5/2007 | Takasu et al. |
| 2007/0101836 A1 | 5/2007 | Ostendarp |
| 2007/0221019 A1 | 9/2007 | Ethington et al. |

FOREIGN PATENT DOCUMENTS

| | | |
|---|---|---|
| JP | 09-275689 | 10/1997 |
| JP | 2004-098230 | 4/2004 |
| KR | 10-2002-011930 | 5/1999 |
| KR | 20-0219135 | 4/2001 |
| KR | 10-2004-096676 | 11/2004 |
| WO | WO 97/48521 | 12/1997 |
| WO | WO 00/25963 | 5/2000 |
| WO | WO 00/48037 | 8/2000 |
| WO | WO 00/50201 | 8/2000 |
| WO | WO 02/06005 | 1/2002 |
| WO | WO 02/37168 | 5/2002 |
| WO | WO 03/086688 | 10/2003 |
| WO | WO 2005/043266 | 5/2005 |

OTHER PUBLICATIONS

E. Trent, et al., Metal Cutting, 4th ed., Butterworth, Heinemann, 2000, pp. 258-260.

J. Zhnag, Theory and Technique of Precision Cutting, Pergamon Press, 1991, Chap. 2, "Nature of Cutting Force Variation in Precision Cutting," pp. 18-31.

M. Krueger, et al., "New Technology in Metalworking Fluids and Grinding Wheels Achieves Tenfold Improvement in Grinding Performance," Coolants/Lubricants for Metal Cutting and Grinding Conference, Chicago, Illinois, Milacron, Inc. and Oak Ridge National Laboratory, Jun. 7, 2000, pp. 15.

* cited by examiner

OPTICAL FILM HAVING A SET OF DIFFRACTIVE FEATURES RANDOMLY REPEATING AT VARIABLE DISTANCES

CROSS REFERENCE TO RELATED APPLICATIONS

This application is a divisional of U.S. Ser. No. 11/620,093, filed Jan. 5, 2007, now U.S. Pat. 7,628,100 which is published, the disclosure of which is incorporated by reference in its entirety herein.

BACKGROUND

Machining techniques can be used to create a wide variety of work pieces such as microreplication tools. Microreplication tools are commonly used for extrusion processes, injection molding processes, embossing processes, casting processes, or the like, to create microreplicated structures. The microreplicated structures may comprise optical films, abrasive films, adhesive films, mechanical fasteners having self-mating profiles, or any molded or extruded parts having microreplicated features of relatively small dimensions, such as dimensions less than approximately 1000 microns.

The microstructures can also be made by various other methods. For example, the structure of the master tool can be transferred on other media, such as to a belt or web of polymeric material, by a cast and cure process from the master tool to form a production tool; this production tool is then used to make the microreplicated structure. Other methods such as electroforming can be used to copy the master tool. Another alternate method to make a light directing film is to directly cut or machine a transparent material to form the appropriate structures. Other techniques include chemical etching, bead blasting, or other stochastic surface modification techniques.

SUMMARY

A first cutting tool assembly, consistent with the present invention, includes a tool post and an actuator configured for attachment to the tool post and for electrical communication with a controller. A tool tip, having at least one diffractive feature, is attached to the actuator and mounted for movement with respect to a work piece to be cut, and the actuator provides for movement of the tool tip in an x-direction into and out of the work piece. The tool tip is in discontinuous contact with the work piece during cutting of it and, during at least a portion of the cutting, the diffractive feature on the tool tip is in contact with the work piece.

A second cutting tool assembly, consistent with the present invention, includes a tool post and an actuator configured for attachment to the tool post and for electrical communication with a controller. A tool tip, having at least one diffractive feature, is attached to the actuator and mounted for movement with respect to a work piece to be cut, and the actuator provides for movement of the tool tip in an x-direction into and out of the work piece. The tool tip is in continuous contact with the work piece during cutting of it and, during at least a portion of the cutting, the diffractive feature on the tool tip is in contact with the work piece.

The first and second assemblies can alternatively include multiple tool tips positioned proximate one another and which simultaneously cut the work piece. The multiple tool tips can each optionally have at least one diffractive feature.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Cutting Tool System

General diamond turning techniques are described in PCT Published Application WO 00/48037, incorporated herein by reference as if fully set forth. The apparatus used in methods and for making optical films or other films can include a fast servo tool. As disclosed in WO 00/48037, a fast tool servo (FTS) is a solid state piezoelectric (PZT) device, referred to as a PZT stack, which rapidly adjusts the position of a cutting tool attached to the PZT stack. The FTS allows for highly precise and high speed movement of the cutting tool in directions within a coordinate system as further described below.

Figure 1:
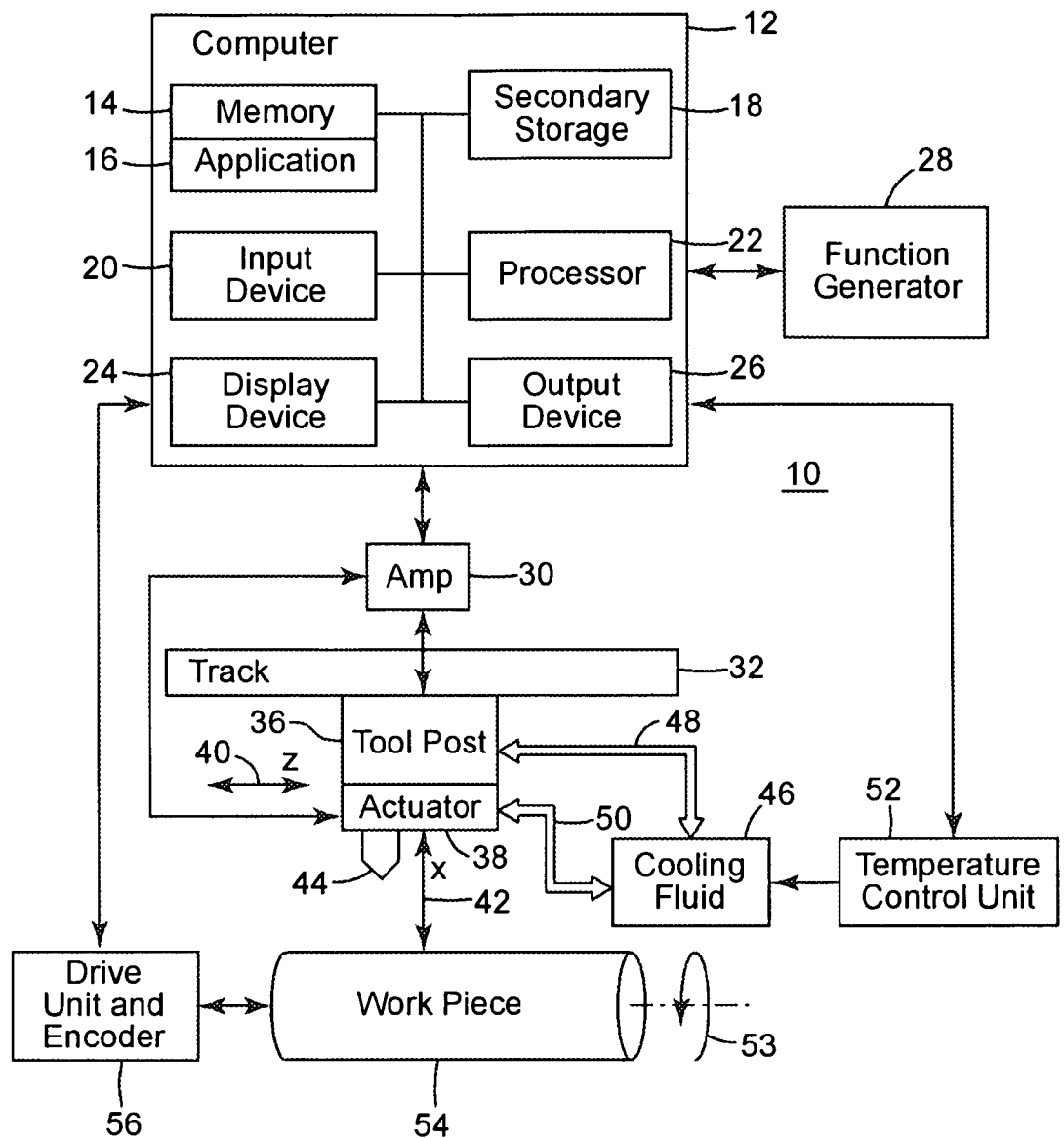
FIG. 1 is a diagram of a cutting tool system for making microstructures in a work piece.

FIG. 1 is a diagram of a cutting tool system 10 for making microstructures in a work piece. Microstructures can include any type, shape, and dimension of structures on, indenting into, or protruding from the surface of an article. For example, microstructures created using the actuators and system described in the present specification can have a 1000 micron pitch, 100 micron pitch, 1 micron pitch, or even a sub-optical wavelength pitch around 200 nanometers (nm). Alternatively, in other embodiments, the pitch for the microstructures can be greater than 1000 microns, regardless as to how they are cut. These dimensions are provided for illustrative purposes only, and microstructures made using the actuators and system described in the present specification can have any dimension within the range capable of being tooled using the system.

System 10 is controlled by a computer 12. Computer 12 has, for example, the following components: a memory 14 storing one or more applications 16; a secondary storage 18 providing for non-volatile storage of information; an input device 20 for receiving information or commands; a processor 22 for executing applications stored in memory 14 or secondary storage 18, or received from another source; a display device 24 for outputting a visual display of information; and an output device 26 for outputting information in other forms such as speakers for audio information or a printer for a hardcopy of information.

The cutting of a work piece 54 is performed by a tool tip 44. An actuator 38 controls movement of tool tip 44 as work piece 54 is rotated by a drive unit and encoder 56, such as an electric motor controlled by computer 12. In this example, work piece 54 is shown in roll form; however, it can be implemented in planar form. Any machineable materials could be used; for example, the work piece can be implemented with aluminum, nickel, copper, brass, steel, or plastics (e.g., acrylics). The particular material to be used may depend, for example, upon a particular desired application such as various films made using the machined work piece. Actuator 38, and the actuators described below, can be implemented with stainless steel, for example, or other materials.

Actuator 38 is removably connected to a tool post 36, which is in turn located on a track 32. The tool post 36 and actuator 38 are configured on track 32 to move in both an x-direction and a z-direction as shown by arrows 40 and 42. Computer 12 is in electrical connection with tool post 36 and actuator 38 via one or more amplifiers 30. When functioning as a controller, computer 12 controls movement of tool post 36 along track 32 and movement of tool tip 44 via actuator 38 for machining work piece 54. If an actuator has multiple PZT stacks, it can use separate amplifiers to independently control each PZT stack for use in independently controlling movement of a tool tip attached to the stacks. Computer 12 can make use of a function generator 28 in order to provide waveforms to actuator 38 in order to machine various microstructures in work piece 54, as further explained below.

The machining of work piece 54 is accomplished by coordinated movements of various components. In particular, the system, under control of computer 12, can coordinate and control movement of actuator 38, via movement of tool post 36, along with movement of the work piece in the c-direction 53 and movement of tool tip 44 in one or more of the x-direction, y-direction, and z-direction, those coordinates being explained below. The system typically moves tool post 36 at a constant speed in the z-direction, although a varying speed may be used. The movements of tool post 36 and tool tip 44 are typically synchronized with the movement of work piece 54 in the c-direction (rotational movement as represented by line 53). All of these movements can be controlled using, for example, numerical control techniques or a numerical controller (NC) implemented in software, firmware, or a combination in computer 12.

The cutting of the work piece can include continuous and discontinuous cutting motion. For a work piece in roll form, the cutting can include a helix-type cutting (sometimes referred to as thread cutting) or individual circles around or about the roll. For a work piece in planar form, the cutting can include a spiral-type cutting or individual circles on or about the work piece. An X-cut can also be used, which involves a nearly straight cutting format where the diamond tool tip can traverse in and out of the work piece but the overall motion of the tool post is rectilinear. The cutting can also include a combination of these types of motions.

Work piece 54, after having been machined, can be used to make films having the corresponding microstructures for use in a variety of applications. Examples of those films include optical films, friction control films, and micro-fasteners or other mechanical microstructured components. The films are typically made using a coating process in which a polymeric material in a viscous state is applied to the work piece, allowed to at least partially cure, and then removed. The cured polymer material typically forms a substantially transparent substrate for the film, which will have substantially the opposite structures than those in the work piece. For example, an indentation in the work piece results in a protrusion in the resulting film. Work piece 54, after having been machined, can also be used to make other articles having discrete elements or microstructures corresponding with those in the tool.

Cooling fluid 46 is used to control the temperature of tool post 36 and actuator 38 via lines 48 and 50. A temperature control unit 52 can maintain a substantially constant temperature of the cooling fluid as it is circulated through tool post 36 and actuator 38. Temperature control unit 52 can be implemented with any device for providing temperature control of a fluid. The cooling fluid can be implemented with an oil product, for example a low viscosity oil. The temperature control unit 52 and reservoir for cooling fluid 46 can include pumps to circulate the fluid through tool post 36 and actuator 38, and they also typically include a refrigeration system to remove heat from the fluid in order to maintain it at a substantially constant temperature. Refrigeration and pump systems to circulate and provide temperature control of a fluid are known in the art. In certain embodiments, the cooling fluid can also be applied to work piece 54 in order to maintain a substantially constant surface temperature of the material to be machined in the work piece.

Figure 2:
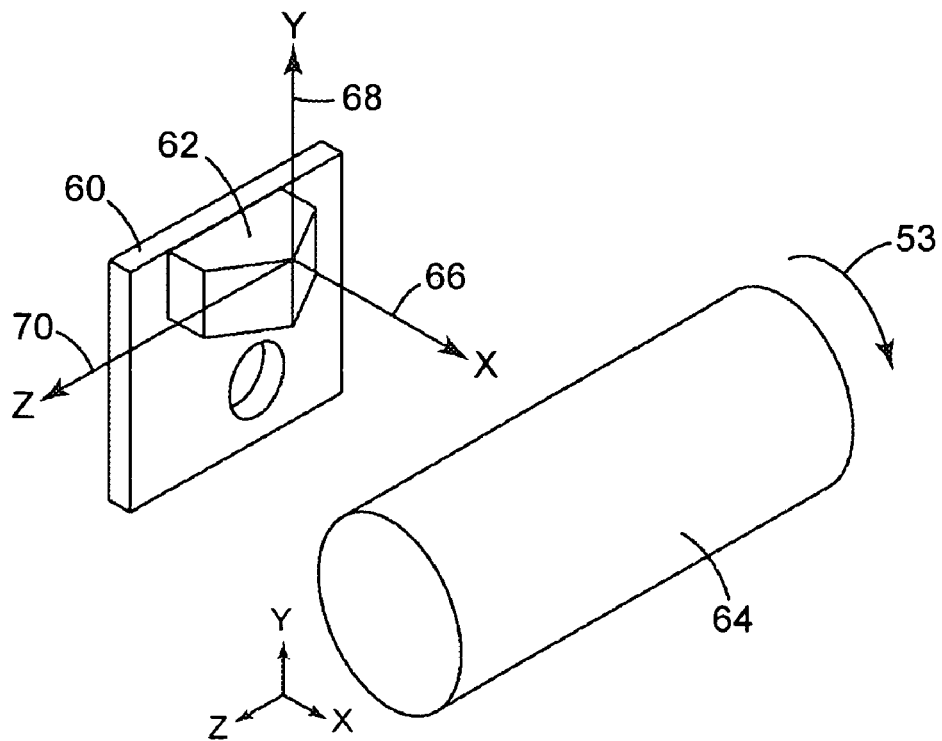
FIG. 2 is a diagram illustrating a coordinate system for a cutting tool.

FIG. 2 is a diagram illustrating a coordinate system for a cutting tool such as system 10. The coordinate system is shown as movement of a tool tip 62 with respect to a work piece 64. Tool tip 62 may correspond with tool tip 44 and is typically attached to a carrier 60, which is attached to an actuator. The coordinate system, in this exemplary embodiment, includes an x-direction 66, a y-direction 68, and a z-direction 70. The x-direction 66 refers to movement in a direction substantially perpendicular to work piece 64. The y-direction 68 refers to movement in a direction transversely across work piece 64 such as in a direction substantially perpendicular to an axis of rotation of work piece 64. The z-direction 70 refers to movement in a direction laterally along work piece 64 such as in a direction substantially parallel to the axis of rotation of work piece 64. The rotation of the work piece is referred to as the c-direction, as represented by arrow 53 shown in FIGS. 1 and 2. If the work piece is implemented in planar form, as opposed to roll form, then the y-direction and z-direction refer to movement in mutually orthogonal directions across the work piece in directions substantially perpendicular to the x-direction. A planar form work piece can include, for example, a rotating disk or any other configuration of a planar material.

The system 10 can be used for high precision, high speed machining. This type of machining must account for a variety of parameters, such as the coordinated speeds of the components and the work piece material. It typically must take into consideration the specific energy for a given volume of metal to be machined, for example, along with the thermal stability and properties of the work piece material. Cutting parameters relating to machining are described in the following references, all of which are incorporated herein by reference as if fully set forth: Machining Data Handbook, Library of Congress Catalog Card No. 66-60051, Second Edition (1972); Edward Trent and Paul Wright, Metal Cutting, Fourth Edition, Butterworth-Heinemann, ISBN 0-7506-7069-X (2000); Zhang Jin-Hua, Theory and Technique of Precision Cutting, Pergamon Press, ISBN 0-08-035891-8 (1991); and M. K. Krueger et al., New Technology in Metalworking Fluids and Grinding Wheels Achieves Tenfold Improvement in Grinding Performance, Coolant/Lubricants for Metal Cutting and Grinding Conference, Chicago, Ill., U.S.A., Jun. 7, 2000.

PZT Stack, Tool Tip Carrier, and Tool Tip

Figure 3:
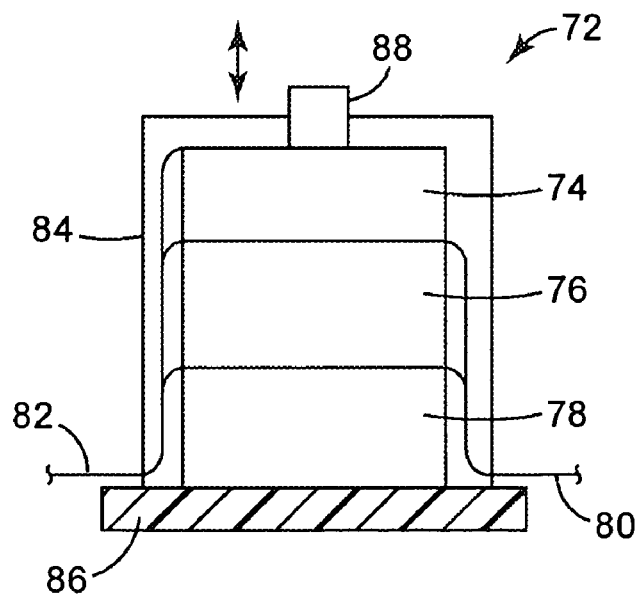
FIG. 3 is a diagram of an exemplary PZT stack for use in a cutting tool.

FIG. 3 is a diagram of an exemplary PZT stack 72 for use in a cutting tool. A PZT stack is used to provide movement of a tool tip connected to it and operates according to the PZT effect, which is known in the art. According to the PZT effect, an electric field applied to certain types of materials causes expansion of them along one axis and contraction along another axis. A PZT stack typically includes a plurality of materials 74, 76, and 78 enclosed within a casing 84 and mounted on a base plate 86. The materials in this exemplary embodiment are implemented with a ceramic material subject to the PZT effect. Three disks 74, 76, and 78 are shown for exemplary purposes only and any number of disks or other materials, and any type of shapes of them, can be used based upon, for example, requirements of particular embodiments. A post 88 is adhered to the disks and protrudes from casing 84. The disks can be implemented with any PZT material such as for example, a barium titanate, lead zirconate, or lead titanate material mixed, pressed, based, and sintered. The disks can also be implemented with a magnetostrictive material, for example.

Electrical connections to the disks 74, 76, and 78, as represented by lines 80 and 82, provide electrical fields to them in order to provide for movement of post 88. Due to the PZT effect and based upon the type of electric field applied, precise and small movement of post 88, such as movement within several microns, can be accomplished. Also, the end of PZT stack 72 having post 88 can be mounted against one or more Belleville washers, which provides for preloading of the PZT stack. The Belleville washers have some flexibility to permit movement of post 88 and a tool tip attached to it.

Figure 4A:
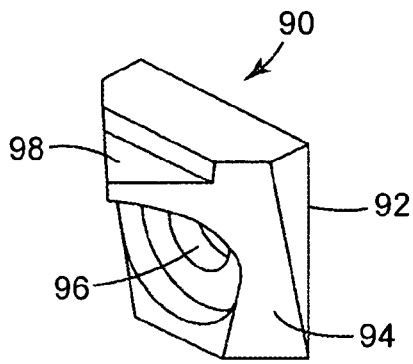
FIG. 4A is a perspective view of a tool tip carrier.
Figure 4B:
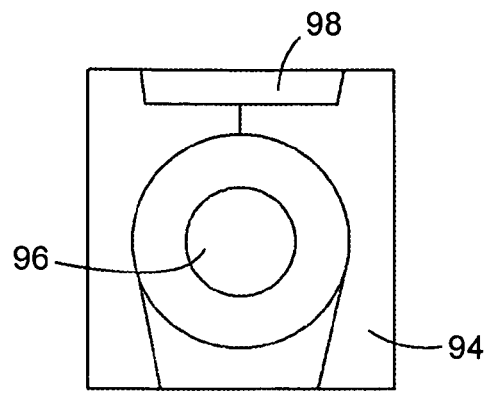
FIG. 4B is a front view of a tool tip carrier for holding a tool tip.
Figure 4C:
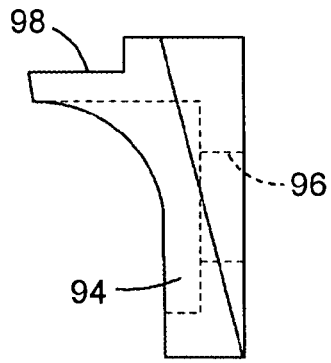
FIG. 4C is a side view of a tool tip carrier.
Figure 4D:
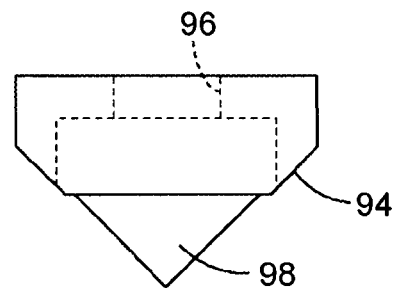
FIG. 4D is a top view of a tool tip carrier.

FIGS. 4A-4D are views of an exemplary tool tip carrier 90, which would be mounted to post 88 of the PZT stack for control by an actuator, as explained below. FIG. 4A is a perspective view of tool tip carrier 90. FIG. 4B is a front view of tool tip carrier 90. FIG. 4C is a side view of tool tip carrier 90. FIG. 4D is a top view of tool tip carrier 90.

As shown in FIGS. 4A-4D, tool tip carrier 90 includes a planar back surface 92, a tapered front surface 94, and a protruding surface 98 with angled or tapered sides. An aperture 96 provides for mounting of tool tip carrier 90 onto a post of a PZT stack. Tapered surface 98 would be used for mounting of a tool tip for machining of a work piece. In this exemplary embodiment, tool tip carrier 90 includes a planar surface to enhance stability of mounting it by providing for more surface area contact when mounted to a PZT stack, and it includes the tapered front surfaces to reduce the mass of it. Tool tip carrier 90 would be mounted to post 88 of the PZT stack by use of an adhesive, brazing, soldering, a fastener such as a bolt, or in other ways.

Other configurations of tool tip carriers are possible based, for example, upon requirements of particular embodiment. The term "tool tip carrier" is intended to include any type of structure for use in holding a tool tip for machining a work piece. Tool tip carrier 90 can be implemented with, for example, one or more of the following materials: sintered carbide, silicon nitride, silicon carbide, steel, titanium, diamond, or synthetic diamond material. The material for tool tip carrier 90 preferably is stiff and has a low mass.

Figure 5A:
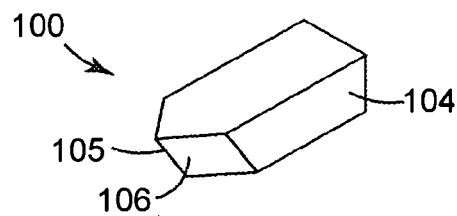
FIG. 5A is a perspective view of a tool tip.
Figure 5B:
FIG. 5B is a front view of a tool tip.
Figure 5C:
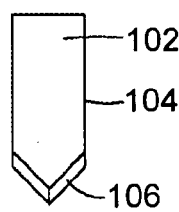
FIG. 5C is a bottom view of a tool tip.
Figure 5D:
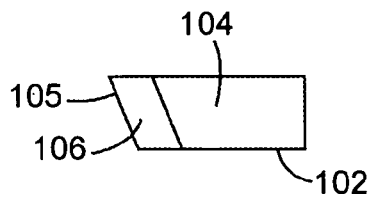
FIG. 5D is a side view of a tool tip.

FIGS. 5A-5D are views of an exemplary tool tip 100, which would be secured to surface 98 of tool tip carrier 90 such as by use of an adhesive, brazing, soldering, or in other ways. FIG. 5A is a perspective view of tool tip 100. FIG. 5B is a front view of tool tip 100. FIG. 5C is a bottom view of tool tip 100. FIG. 5D is a side view of tool tip 100. As shown in FIGS. 5A-5D, tool tip 100 includes sides 104, tapered and angled front surfaces 106, and a bottom surface 102 for securing it to surface 98 of tool tip carrier 90. The front portion 105 of tool tip 100 is used for machining of a work piece under control of an actuator. Tool tip 100 can be implemented with, for example, a diamond slab.

Interrupted Cut FTS Actuator

An interrupted cut FTS actuator can be used to make small microstructures as the tool tip is in discontinuous contact with work piece during cutting, creating non-adjacent microstructures. These features can be used to make film light guides, micro-fluidic structures, segmented adhesives, abrasive articles, optical diffusers, high contrast optical screens, light redirecting films, anti-reflection structures, light mixing structures, and decorative films.

The actuator can provide for other advantages. For example, the features can be made so small as to be invisible to the naked eye. This type of feature reduces the need for a diffuser sheet to hide the light extraction features in a liquid crystal display, for example. Another advantage is that the extraction features can be made linear or circular. In the linear case, they can be used with conventional cold cathode fluorescent lamp (CCFL) light sources, for example. In the circular case, the features can be made on circular arcs with a center point located where an LED would normally be positioned. Yet another advantage relates to programming and structure layout where all features need not lie along a single line as with a continuous groove. The area density of the light extraction features can be adjusted deterministically by arranging spacing along the features, spacing orthogonal to the features, and depth. Furthermore, the light extraction angle can be made preferential by selecting the angle and half angles of the cut facets.

The depth of the features may be in the region of 0 to 35 microns, for example, and more typically 0 to 15 microns. For a roll work piece, the length of any individual feature is controlled by the revolutions per minute (RPM) of the rotating work piece along the c-axis, and the response time of and waveform input to the FTS. The feature length can be controlled from 1 to 200 microns, for example. For a helix type cutting, the spacing orthogonal to the grooves (pitch) can also be programmed from 1 to 1000 microns. As illustrated below, the tool tip to make the features will taper-in and taper-out of the material, thereby creating structures, the shape of which are controlled by the RPM, the response time of and waveform input to the FTS, the resolution of the spindle encoder, and the clearance angle of the diamond tool tip (for example, a maximum of 45 degrees). The clearance angle can include a rake angle of the tool tip. The features can have a wide variety of three-dimensional shapes such as, for example, symmetrical, asymmetrical, substantially hemispherical, prismatic, and semi-ellipsoidal.

Figure 6A:
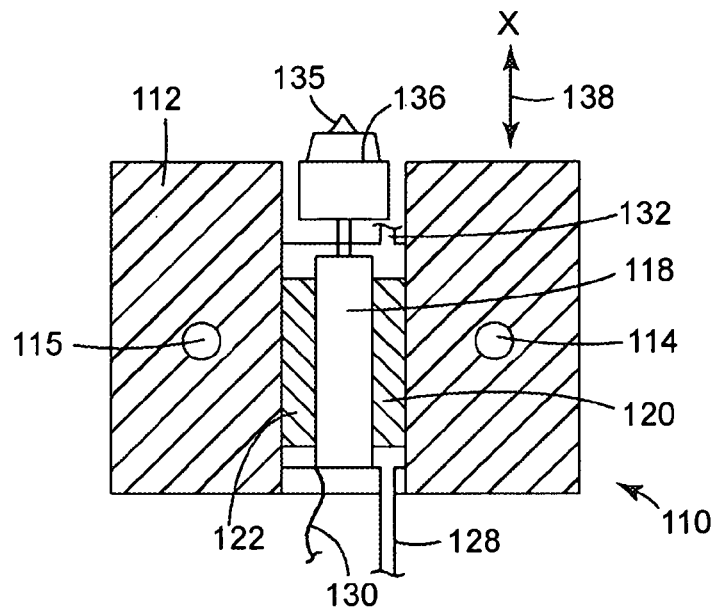
FIG. 6A is a top sectional view of an interrupted cut FTS actuator.
Figure 6B:
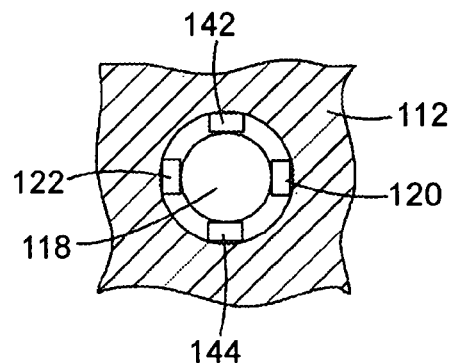
FIG. 6B is a front sectional view illustrating placement of a PZT stack in an actuator.
Figure 6C:
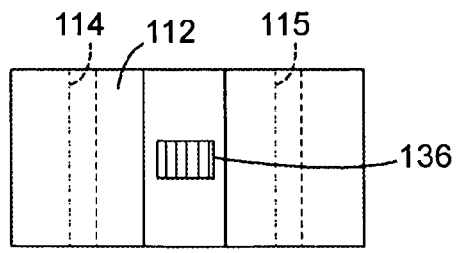
FIG. 6C is a front view of an actuator.
Figure 6D:
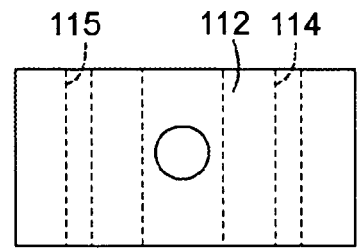
FIG. 6D is a back view of an actuator.
Figure 6E:
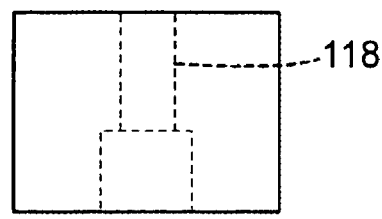
FIG. 6E is a top view of an actuator.
Figure 6F:
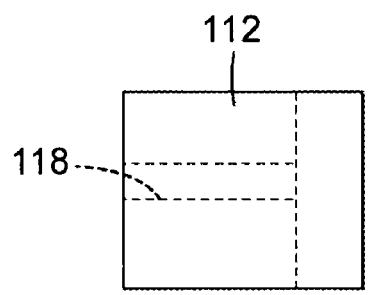
FIGS. 6F and 6G are side views of an actuator.
Figure 6G:
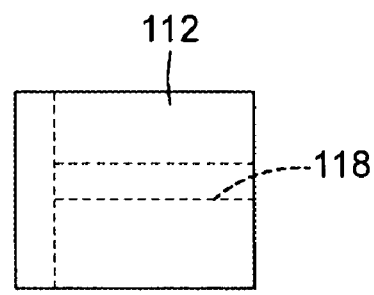
Figure 6H:
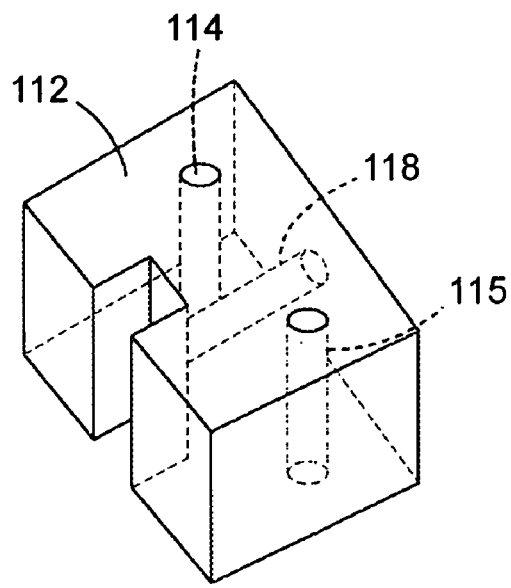
FIG. 6H is a perspective view of an actuator.

FIGS. 6A-6H are views of an exemplary actuator 110 for use in implementing an interrupted cut microreplication system and process. The term "actuator" refers to any type of actuator or other device that provides for movement of a tool tip in substantially an x-direction for use in machining a work piece. FIG. 6A is a top sectional view of actuator 110. FIG. 6B is a front sectional view illustrating placement of a PZT stack in actuator 110. FIG. 6C is a front view of actuator 110. FIG. 6D is a back view of actuator 110. FIG. 6E is a top view of actuator 110. FIGS. 6F and 6G are side views of actuator 110. FIG. 6H is a perspective view of actuator 110. Some details of actuator 110 in FIGS. 6C-6H have been removed for clarity.

As shown in FIGS. 6A-6H, actuator 110 includes a main body 112 capable of holding an x-direction PZT stack 118. PZT stack 118 is attached to a tool tip carrier 136 having a tool tip 135 for using in moving the tool tip in an x-direction as shown by arrow 138. PZT stack 118 can be implemented with the exemplary PZT stack 72 shown in FIG. 3. The tool tip 135 on a carrier 136 can be implemented with the tool tip carrier shown in FIGS. 4A-4D and the tool tip shown in FIGS. 5A-5D. Main body 112 also includes two apertures 114 and 115 for use in removably mounting it to tool post 36, such as via bolts, for machining work piece 54 under control of computer 12.

PZT stack 118 is securely mounted in main body 112 for the stability required for precise controlled movement of tool tip 135. The diamond on tool tip 135 in this example is an offset 45 degree diamond with a vertical facet, although other types of diamonds may be used. For example, the tool tip can be V-shaped (symmetric or asymmetric), round-nosed, flat, or a curved facet tool. Since the discontinuous (non-adjacent) features are cut on a diamond turning machine, they can be linear or circular. Furthermore, since the features are not continuous, it is not required that they even be located along a single line or circle. They can be interspersed with a pseudorandomness.

PZT stack 118 is secured in main body 112 by rails such as rails 120 and 122. The PZT stack 118 can preferably be removed from main body 112 by sliding it along the rails and can be secured in place in main body 112 by bolts or other fasteners. PZT stack 118 includes electrical connection 130 for receiving signals from computer 12. The end cap of PZT stacks 118 includes a port 128 for receiving cooling fluid such as oil from reservoir 46, circulating it around the PZT stack, and delivering the oil back to reservoir 46, via port 132, for maintaining temperature control of it. Main body 112 can include appropriate channels for directing the cooling fluid around PZT stack 118, and the cooling fluid can be circulated by a pump or other device in temperature control unit 52.

FIG. 6B is a front sectional view illustrating placement of PZT stack 118 in main body 112 with the end cap of PZT stack 118 not shown. Main body 112 can include a plurality of rails in each aperture for the PZT stacks to hold them securely in place. For example, PZT stack 118 is surrounded by rails 120, 122, 142, and 144 in order to hold it securely in place when mounted in main body 112. The end cap attached to PZT stack 118 can accommodate bolts or other fasteners to secure PZT stack to one or more of the rails 120, 122, 142, and 144, and the end cap can also provide for sealing PZT stack 118 in main body 112 for use in circulating the cooling fluid around it. PZT stack 118 can include one or more Belleville washers positioned between the stacks and the tool tip carrier 136 for preloading of them.

Figure 7A:
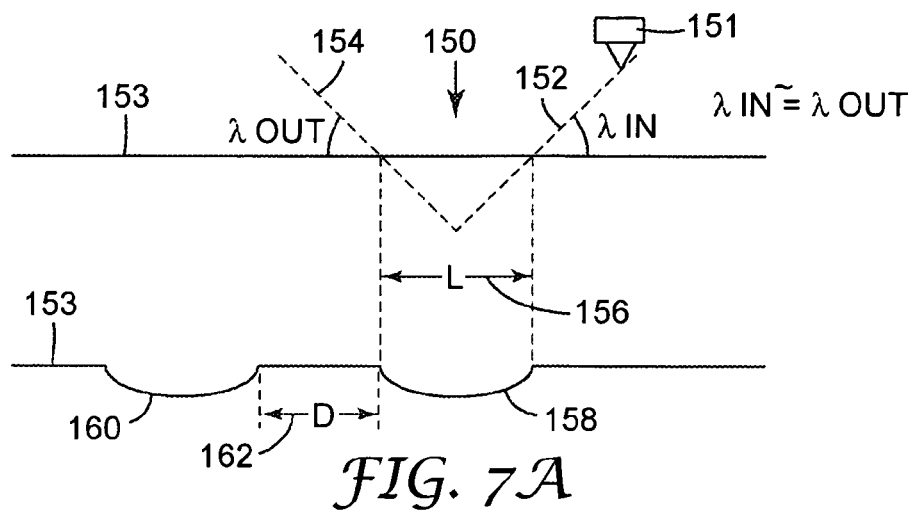
FIG. 7A is a diagram illustrating an interrupted cut with substantially equal taper-in and taper-out angles into and out of a work piece.
Figure 7B:
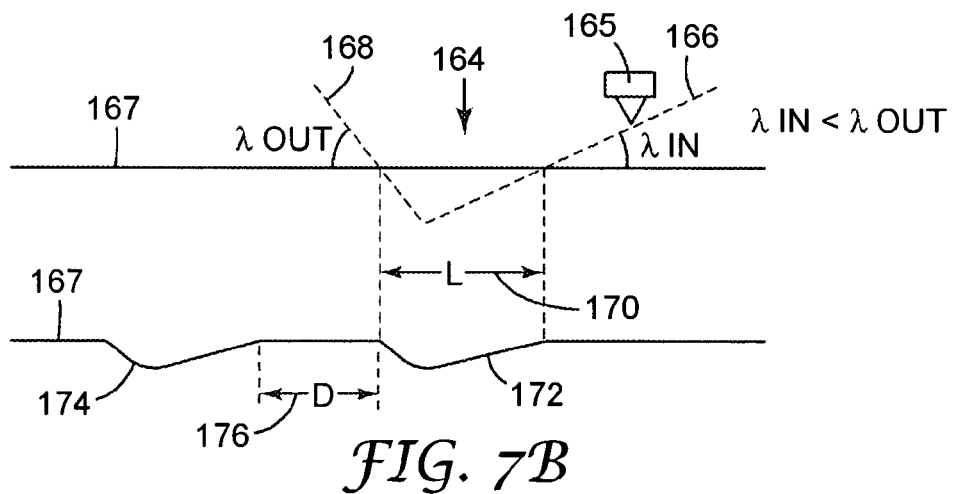
FIG. 7B is a diagram illustrating an interrupted cut with a taper-in angle less than a taper-out angle into and out of a work piece.
Figure 7C:
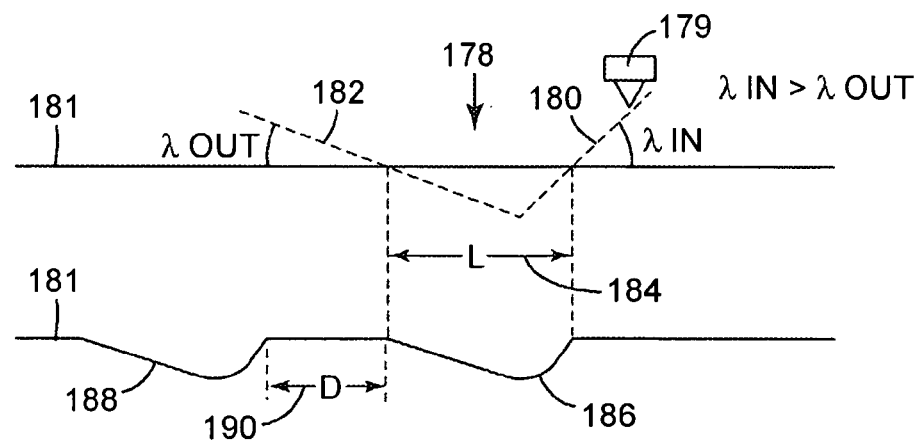
FIG. 7C is a diagram illustrating an interrupted cut with a taper-in angle greater than a taper-out angle into and out of a work piece.

FIGS. 7A-7C illustrate interrupted cut machining of a work piece using the exemplary actuator and system described above. In particular, FIGS. 7A-7C illustrate use of variable taper-in and taper-out angles of a tool tip, and those angles can be controlled using, for example, the parameters identified above. Each of FIGS. 7A-7C illustrate examples of the work piece before and after being cut with varying taper-in and taper-out angles. The taper-in angle is referred to as $\lambda_{IN}$ and the taper-out angle is referred to as $\lambda_{OUT}$. The terms taper-in angle and taper-out angle mean, respectively, an angle at which a tool tip enters a work piece and leaves a work piece during machining. The taper-in and taper-out angles do not necessarily correspond with angles of the tool tip as it moves through a work piece; rather, they refer to the angles at which the tool tip contacts and leaves the work piece. In FIGS. A-7C, the tool tips and work pieces can be implemented, for example, with the system and components described above.

FIG. 7A is a diagram illustrating an interrupted cut 150 with substantially equal taper-in and taper-out angles into and out of a work piece 153. As shown in FIG. 7A, a taper-in angle 152 of a tool tip 151 into a work piece 153 is substantially equal to a taper-out angle 154 ($\lambda_{IN} \approx \lambda_{OUT}$). The duration of the tool tip 151 into work piece 153 determines a length L (156) of the resulting microstructure. Using substantially equal taper-in and taper-out angles results in a substantially symmetrical microstructure 158 created by removal of material from the work piece by the tool tip. This process can be repeated to make additional microstructures, such as microstructure 160, separated by a distance D (162).

FIG. 7B is a diagram illustrating an interrupted cut with a taper-in angle less than a taper-out angle into and out of a work piece 167. As shown in FIG. 7B, a taper-in angle 166 of a tool tip 165 into a work piece 167 is less than a taper-out angle 168 ($\lambda_{IN} < \lambda_{OUT}$). The dwell time of the tool tip 165 in work piece 167 determines a length 170 of the resulting microstructure. Using a taper-in angle less than a taper-out angle results in an asymmetrical microstructure, for example microstructure 172, created by removal of material from the work piece by the tool tip. This process can be repeated to make additional microstructures, such as microstructure 174, separated by a distance 176.

FIG. 7C is a diagram illustrating an interrupted cut with a taper-in angle greater than a taper-out angle into and out of a work piece 181. As shown in FIG. 7C, a taper-in angle 180 of a tool tip 179 into a work piece 181 is greater than a taper-out angle 182 ($\lambda_{IN} > \lambda_{OUT}$). The dwell time of the tool tip 179 in work piece 181 determines a length 184 of the resulting microstructure. Using a taper-in angle greater than a taper-out angle results in an asymmetrical microstructure, for example microstructure 186, created by removal of material from the work piece by the tool tip. This process can be repeated to make additional microstructures, such as microstructure 188, separated by a distance 190.

In FIGS. 7A-7C, the dashed lines for the taper-in and taper-out angles (152, 154, 166, 168, 180, 182) are intended to conceptually illustrate examples of angles at which a tool tip enters and leaves a work piece. While cutting the work piece, the tool tip can move in any particular type of path, for example a linear path, a curved path, a path including a combination of linear and curved motions, or a path defined by a particular function. The path of the tool tip can be chosen to optimize cutting parameters such as total time to complete cutting the work piece.

Figure 8:
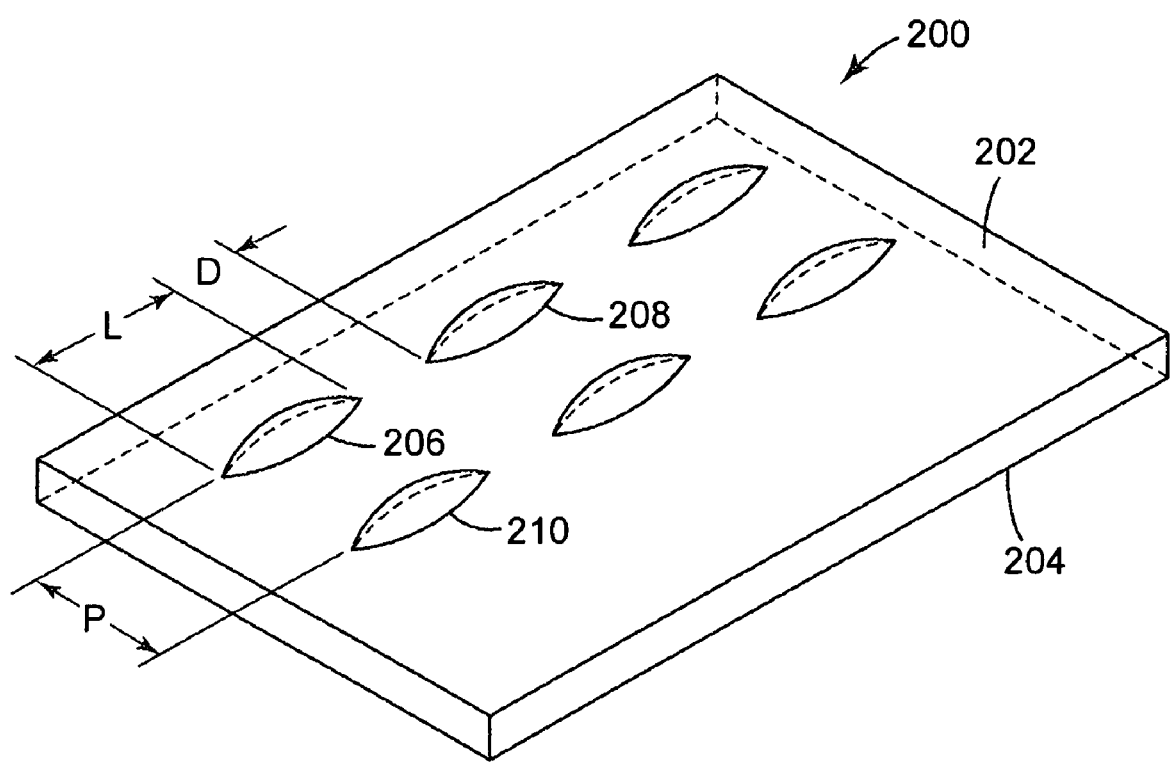
FIG. 8 is a diagram conceptually illustrating microstructures that can be made using the cutting tool system having an interrupted cut FTS actuator.

FIG. 8 is a diagram conceptually illustrating microstructures in a film that can be made using the cutting tool system having an interrupted cut FTS actuator to make a machined work piece and using that work piece to make a structured film. As shown in FIG. 8, an article 200 includes a top surface 202 and a bottom surface 204. Top surface 202 includes interrupted cut protruding microstructures such as structures 206, 208, and 210, and those microstructures can be made using the actuators and system described above to machine a work piece and then using that work piece to make a film or article using a coating technique. In this example, each microstructure has a length L, the sequentially cut microstructures are separated by a distance D, and adjacent microstructures are separated by a pitch P. Examples of an implementation of those parameters are provided above.

Machined Tool Tips

Figure 9A:
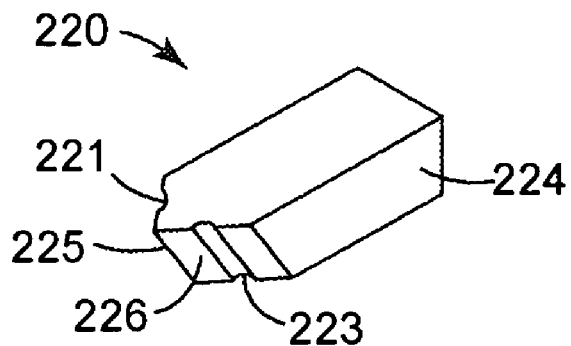
FIG. 9A is a perspective view of a machined tool tip.
Figure 9B:
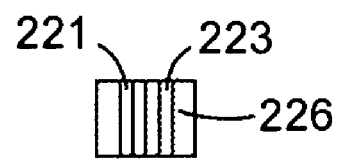
FIG. 9B is a front view of a machined tool tip.
Figure 9C:
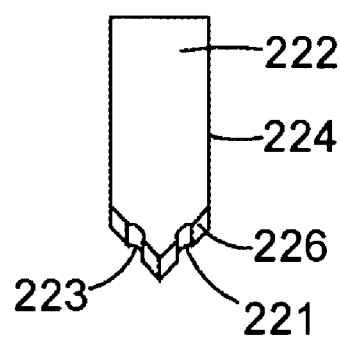
FIG. 9C is a bottom view of a machined tool tip.
Figure 9D:
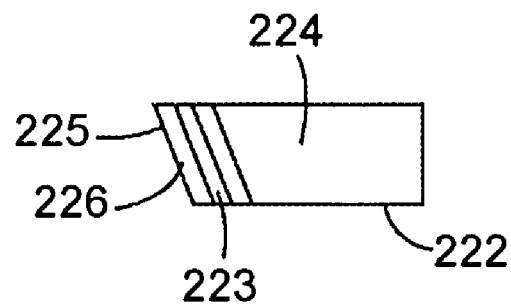
FIG. 9D is a side view of a machined tool tip.

FIGS. 9A-9D are views of an exemplary machined tool tip 220, which would be secured to surface 98 of tool tip carrier 90 such as by use of an adhesive, brazing, soldering, or in other ways. FIG. 9A is a perspective view of tool tip 220. FIG. 9B is a front view of tool tip 220. FIG. 9C is a bottom view of tool tip 220. FIG. 9D is a side view of tool tip 220. As shown in FIGS. 9A-9D, tool tip 220 includes sides 224, tapered and angled front surfaces 226, and a bottom surface 222 for securing it to surface 98 of tool tip carrier 90. The front portion 225 of tool tip 220 is used for machining of a work piece under control of an actuator, for example by using the system described above. Tool tip 220 is machined in that it also has microstructures (e.g., grooves) 221 and 223 on front portion 225, and the microstructures 221 and 223 are also used for machining of a work piece. The microstructures in the machined tool tip can have one or more of those exemplary shapes and dimensions identified above.

Tool tip 220 can be implemented with, for example, a diamond slab. The microstructures 221 and 223, as well as other microstructures on machined tool tips, can be made preferably via ion milling. Other techniques to make microstructures on tool tips include micro electrical discharge machining, grinding, lapping, ablation, or other ways to impart scratches or features into the tool tip. Alternatively, diamonds can be lapped in a traditional fashion and bonded precisely together to make a macro tool assembly having microstructured features. Only one microstructure is shown on each side of the tool tip for illustrative purposes only; the tool tip can have any number of microstructures and any shape, dimension, and configuration of them. As an alternative to an indenting microstructure, machined tool tips can have protruding microstructures, or a combination of indenting and protruding microstructures.

Figure 10A:
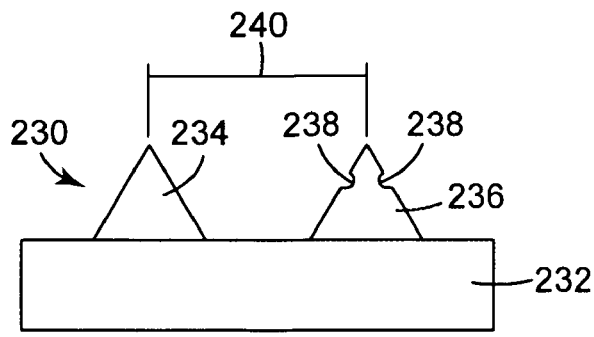
FIG. 10A is a side view of a multi-tip tool having machined and non-machined tool tips.

It is possible to mount more than one tool tip to a tool tip carrier, such as carrier 90, for machining of a work piece. In those embodiments, the multiple tool tips machine a work piece to essentially simultaneously make microstructures in it, such as parallel microstructured grooves or other features. FIG. 10A is a side view of an exemplary multi-tip tool 230 having machined and non-machined tool tips. The term "non-machined" tool tip refers to a tool tip that, once having been created through machining, is not subjected to additional machining that would be used to make microstructures in the tool tip. Multi-tip tool 230 has a non-machined tool tip 234 and a machined tool tip 236 with microstructures 238. Tool tips 234 and 236 are mounted to a base 232 such as surface 98 of tool tip carrier 90, and they can be mounted using, for example, adhesive, brazing, soldering, or in other ways. The distance 240 between tool tips 234 and 236 determines a pitch of the corresponding microstructures machined with multi-tip tool 230 with the microstructure corresponding with tool tip 236 having additional microstructures machined within it.

Figure 10B:
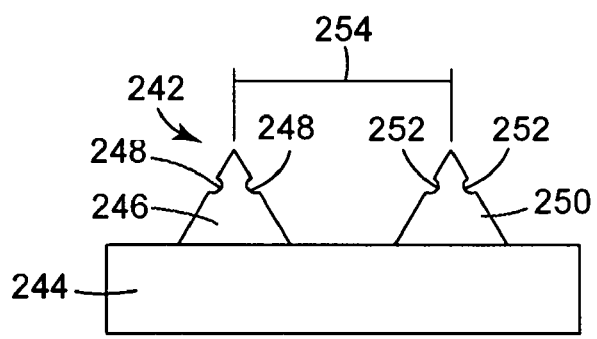
FIG. 10B is a side view of a multi-tip tool having multiple machined tool tips.

FIG. 10B is a side view of a multi-tip tool 242 having multiple machined tool tips. Multi-tip tool 242 has a machined tool tip 246 with microstructures 248 and another machined tool tip 250 with microstructures 252. Tool tips 246 and 250 are mounted to a base 244 such as surface 98 of tool tip carrier 90, and they can be mounted using, for example, adhesive, brazing, soldering, or in other ways. The distance 254 between tool tips 246 and 250 determines a pitch of the corresponding microstructures machined with multi-tip tool 242 with the microstructures corresponding with tool tips 246 and 250 each having additional microstructures machined within it corresponding with microstructures 248 and 252, respectively.

In FIGS. 10A and 10B, only two tool tips are shown for illustrative purposes only; a multi-tip tool can have any number of tool tips. The multiple tool tips, when machined, can have the same or different microstructures, and those individual microstructures can have one or more of those exemplary shapes and dimensions identified above. The distance (pitch 240 and 254) between the tool tips in a multi-tip tool can include a 1000 micron pitch, 100 micron pitch, 1 micron pitch, or even a sub-optical wavelength pitch around 200 nm. Alternatively, in other embodiments, the pitch between the tool tips in a multi-tip tool can be greater than 1000 microns. In a multi-tip tool have more then two tool tips, the pitch between adjacent tool tips can be the same or different. These dimensions are provided for illustrative purposes only, and microstructures made using the actuators and system described in the present specification can have any dimension within the range capable of being tooled using the system.

Figure 11A:
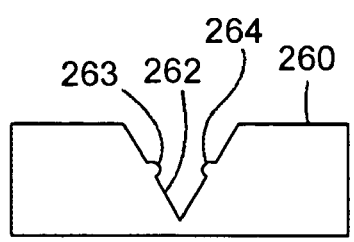
FIGS. 11A and 11B are side and perspective views, respectively, conceptually illustrating microstructures that can be made using the cutting tool system having an FTS actuator with at least one machined tool tip.
Figure 11B:
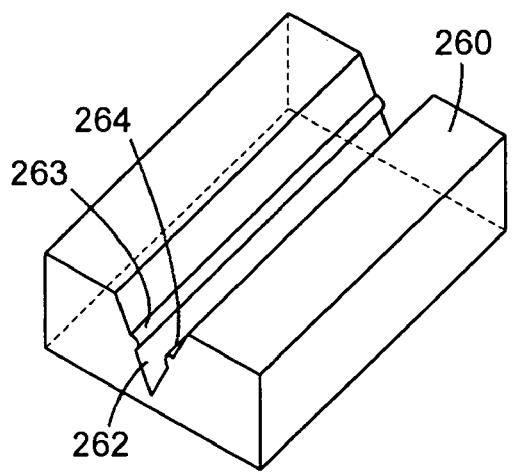

Work piece 54 can be machined using any of the machined tool tips or multi-tips tools, and the machined work piece can be used to make films as described above. The work piece can be machined in a continuous cutting or interrupted cutting using the system and process described above, for example. FIGS. 11A and 11B are side and perspective views, respectively, conceptually illustrating microstructures that can be made using the cutting tool system having an FTS actuator with at least one machined tool tip. As shown in FIGS. 11A and 11B, a work piece 260 has a continuous machined microstructure 262 (e.g., a groove) having machined microstructures 263 and 264 (e.g., ridges) within it as caused by the microstructures in a corresponding machined tool tip.

Figure 12A:
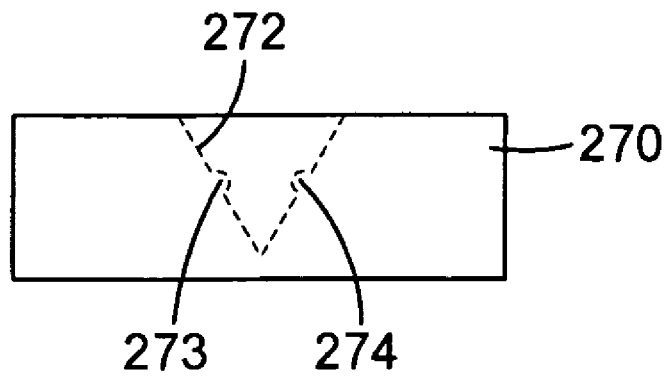
FIGS. 12A and 12B are side and perspective views, respectively, conceptually illustrating microstructures that can be made using the cutting tool system having an interrupted cut FTS actuator with at least one machined tool tip.
Figure 12B:
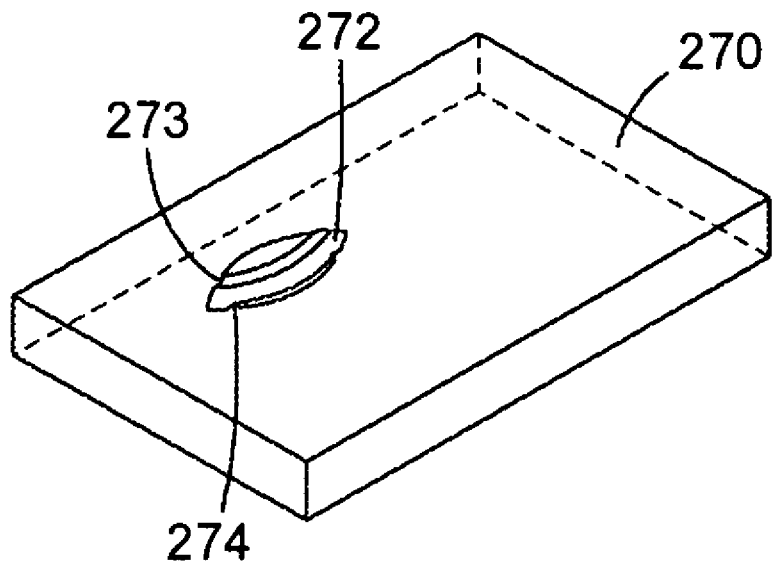

FIGS. 12A and 12B are side and perspective views, respectively, conceptually illustrating microstructures that can be made using the cutting tool system having an interrupted cut FTS actuator with at least one machined tool tip. As shown in FIGS. 12A and 12B, a work piece 270 has a discontinuous (interrupted cut) machined microstructure 272 (e.g., a feature not contiguous with other machined features) having machined microstructures 273 and 274 (e.g., ridges) within it as caused by the microstructures in a corresponding machined tool tip. The interrupted cutting using one or more machined tool tips can vary the taper-in and taper-out angles of the tool tip into and out of a work piece as described above and shown in FIGS. 7A-7C.

Work pieces 260 and 270 can then be used in a coating technique, as described above, to make films or other articles having the opposite microstructures corresponding with the microstructures in work pieces 260 and 270.

Machined Tool Tips with Diffractive Features

FIGS. 13-22 are views of exemplary machined tool tips having diffractive features, and these tool tips would be secured to surface 98 of tool tip carrier 90 such as by use of an adhesive, brazing, soldering, or in other ways. FIGS. 23A, 23B, 24A, and 24B are diagrams illustrating methods to fabricate tool tips to form diffractive features in them. The features shown on the tool tips in FIGS. 13-22 are not shown to scale. Rather, the tool tips shown in FIGS. 13-22 are intended to show examples of shapes and configurations of features to provide for diffraction, and the features can have any dimension and spacing depending upon, for example, an amount of diffraction desired from the features. Aside from the diffractive features, the tool tips shown in FIGS. 13-22 can have, for example, the same general shape and configuration as tool tip 100 having two facets, front surfaces 106, optionally with the tapered front portion 105.

In some embodiments, diffractive features refer to features in a film or article causing diffraction of light or to features in a tool that, when used to make a film or article, result in diffractive features in the film or article. As described above, the film or article having the diffractive features are made from a machined tool having the corresponding diffractive features. The diffractive features can be tuned to obtain a desired amount of diffraction in a film or article made from the machined tool. In particular, the size and shape of the diffractive features, along with the spacing between the diffractive features, can be designed for the amount or degree of diffraction of light desired for a particular application. For example, as the spacing between the features decreases, the features cause increasing diffraction of light. Therefore, features spaced farther apart cause less diffraction, and features spaced more closely together cause more diffraction. In certain embodiments, for example, the diffractive features, such as grooves, can be spaced within 10 microns, 5 microns, 1 micron, or within a distance near a particular wavelength of light. In one embodiment, the diffractive features include multiple features having a substantially triangular cross-sectional shape and having a spacing of 650 nm between them. For example, one embodiment includes 28 such features each spaced approximately 650 nm apart.

In other embodiments, diffractive features refer to features having dimensions in or approximate the ranges described for optical applications and as used in a film or article for non-optical applications such as hydrophobicity, microfluidic capillary action, friction control films, micro-fasteners, or other mechanical microstructured components.

In certain embodiments, films made from tools machined as described in the present specification will have a particular signature indicating that they were made from such tools. In particular, in some embodiments a multi-tip tool (e.g., tools 230 and 242) is used for continuous cutting of one or more passes around the tool (work piece 54). The distance between the diffractive features or grooves made by tips on the tool (e.g., distances 240 and 254) are substantially constant as the tips are held a constant distance apart by the tool base (e.g., bases 232 and 244). The tool is moved along the face of the work piece at an approximately constant speed in the z-direction by a linear motor. However, the speed is not exactly constant because the linear motor occasionally moves the tool slightly backward or forward at a speed slightly more than the nominal speed due to noise in the servo system. These variations in speed result in occasional variations in the distance between grooves. A typical variation in one particular application was approximately plus or minus 0.2 microns. Repeatedly aligning a tool tip at a constant distance adjacent previously cut features can be difficult and is not required for many applications. A film made from a tool cut in this manner will thus have a repeating set of diffractive features or grooves with a substantially constant distance corresponding with the distance between the tips on the multi-tip tool (e.g., distances 240 and 254), and it will have a randomly repeating variable distance between the sets of diffractive features or grooves resulting from small variations in the speed of the tool in the z-direction.

The tools shown in FIGS. 13-22, 23A, 23B, 24A, and 24B can be implemented with, for example, a diamond slab. The diffractive features on the tool tips can be made preferably via ion milling. Other techniques to make diffractive features on tool tips include micro electrical discharge machining, grinding, lapping, ablation, or other ways to impart scratches or features into the tool tip. Alternatively, diamonds can be lapped in a traditional fashion and bonded precisely together to make a macro tool assembly having diffractive features. As an alternative to an indenting diffractive feature, machined tool tips can have protruding diffractive features, or a combination of indenting and protruding diffractive features.

Work piece 54 can be machined using any of the exemplary tool tips shown in FIGS. 13-22, 23B and 24B, and the machined work piece can be used to make films as described above. The work piece can be machined in a continuous cutting or interrupted cutting using the system and process described above, for example, to machine diffractive features into the work piece. The machined work piece or tool can then be used to make films, as described above, having corresponding diffractive features. These films can be made to have unique diffractive and refractive optical power. An exemplary purpose of the these unique diffractive and refractive optical forms in enhancement films is to provide more options for moving light out of the central viewing zone with more versatility than simply putting a radius on the tip of a tool.

The master tool can be achieved through plunge or thread cutting with the ion milled diamond, as described above. Plunge and thread cutting are described in U.S. Pat. Nos. 7,140,812 and 6,707,611, which are incorporated herein by reference. In films made from the master tool machined with these tool tips, the features do not have to be present on every groove of the films. For example, multi-start thread or plunge cutting can be used to interleave grooves cut with both conventional diamonds and ion milled diamonds. The ion milled diffractive features can be present on only one of the two facets of a typical symmetric prism angle, for example, 90°. This type of tool tip allows for finer optical tuning of the luminance profile. The ion milled diffractive features facilitate a smoother cut-off, or luminance profile, in optical films such as BEF. The ion milled features can also facilitate cutting time reduction for optical film when multiple tool tips are used.

Figure 13:
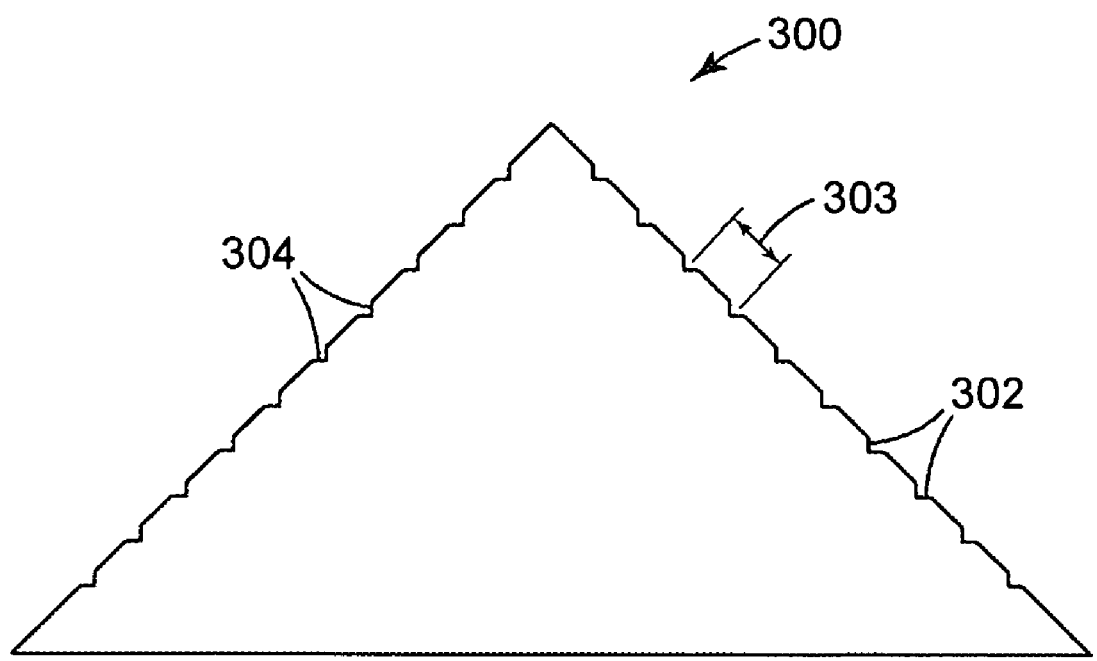
FIG. 13 is a side view of a tool tip with diffractive features on both facets.

FIG. 13 is a side view of a tool tip 300 with diffractive features 302 and 304 on both facets. The diffractive features 302 and 304 are shown as V-grooves or notches in this example. The grating spacing 303 between diffractive features can be constant or varied to produce different properties that would be of value or interest. For example, by varying the grating spacing, one could smooth the divergence profile in corresponding optical films as compared to a constant grating spacing. This spacing can also help with wavelength dependence and ameliorate color effects. The shape of the ion milled grating does not have to be V-shaped, although negative draft angles should typically be avoided. The width and depth of the grating grooves or notches will usually be less than one micron but could be greater than one micron. There are many shapes which could be utilized to produce the notches or grooves. For visible light applications, the distance 303 between grating grooves will usually be in the 0.5 micron to 10 micron spacing range, although other ranges may be used to meet design goals.

A diamond tool was produced using this design with the diffractive features 302 and 304 being 5 microns apart (distance 303) and with each diffractive feature having a width of 1 micron across the groove. In this case, the diffractive grooves were shown to provide controlled scattering of the light away from the region of refractive, transmitted maxima which cut off at approximately 31° in the film samples. The diffractive features of this film were shown to smoothly broaden the luminance profile using photometric measurements with a goniometer. The luminance profile can be tuned by making the grating spacing greater and reducing the number of grooves or features. Alternatively, decreasing the grating spacing and increasing the number of grooves or features can also be used to fine tune the profile.

The examples of ion milled diamond forms, described below for FIGS. 14-22, illustrate other embodiments for tuning the luminance profile.

Figure 14:
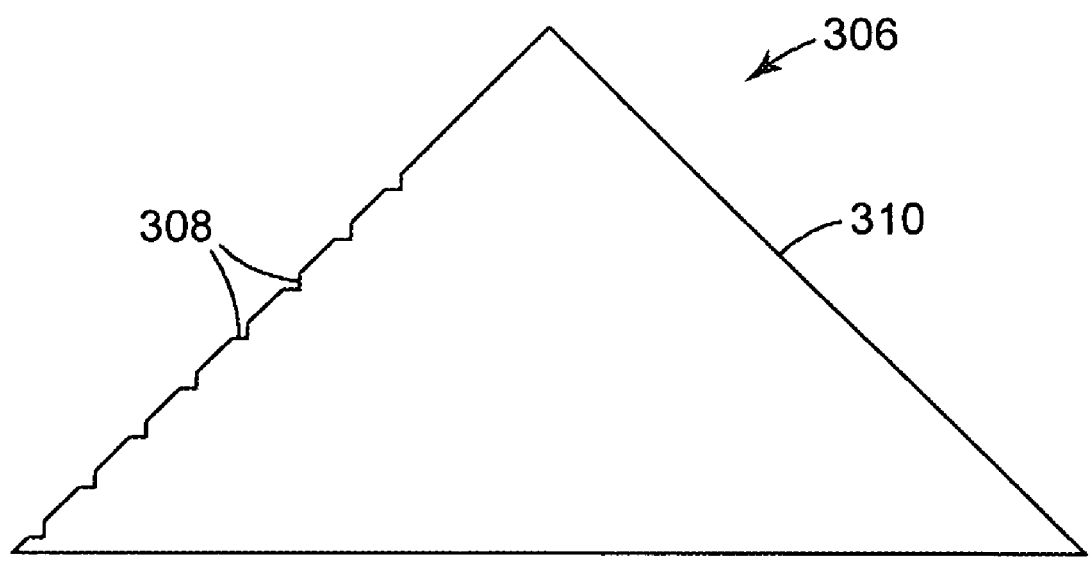
FIG. 14 is a side view of a tool tip with diffractive features on one facet.

FIG. 14 is a side view of a tool tip 306 with diffractive features 308 on one facet and no features on the other facet 310. Diffractive features 308 may comprise V-grooves or notches and have a constant or variable grating spacing.

Figure 15:
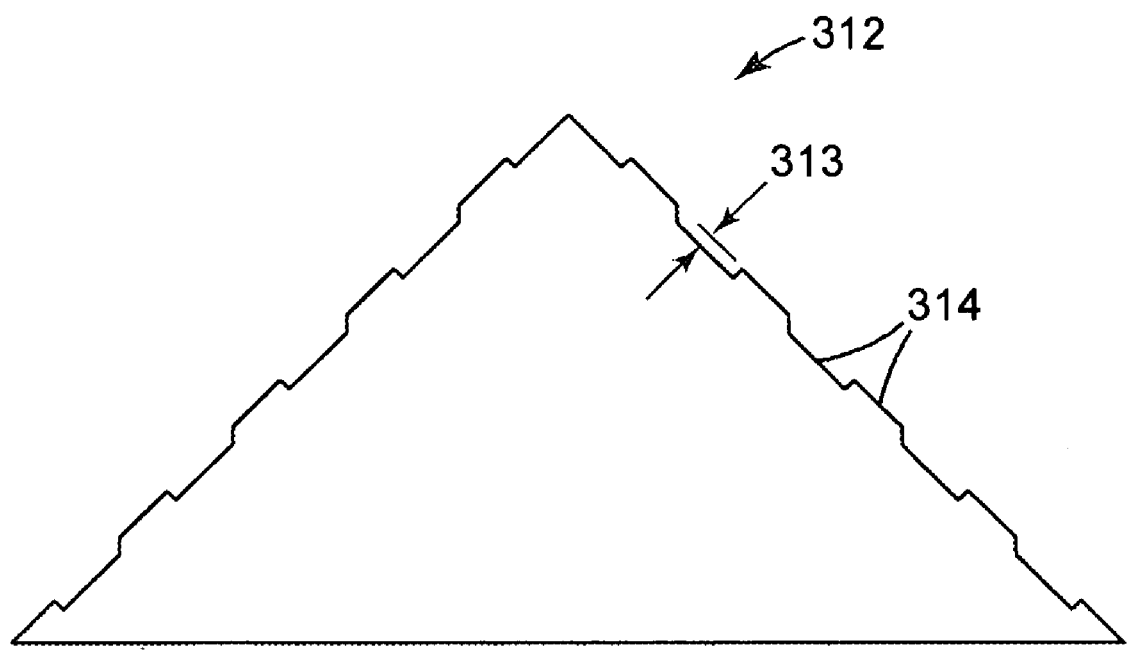
FIG. 15 is a side view of a tool tip with diffractive features using step height variation.

FIG. 15 is a side view of a tool tip 312 with diffractive features 314 using a step height variation 313, which may be constant or varying among the features.

Figure 16:
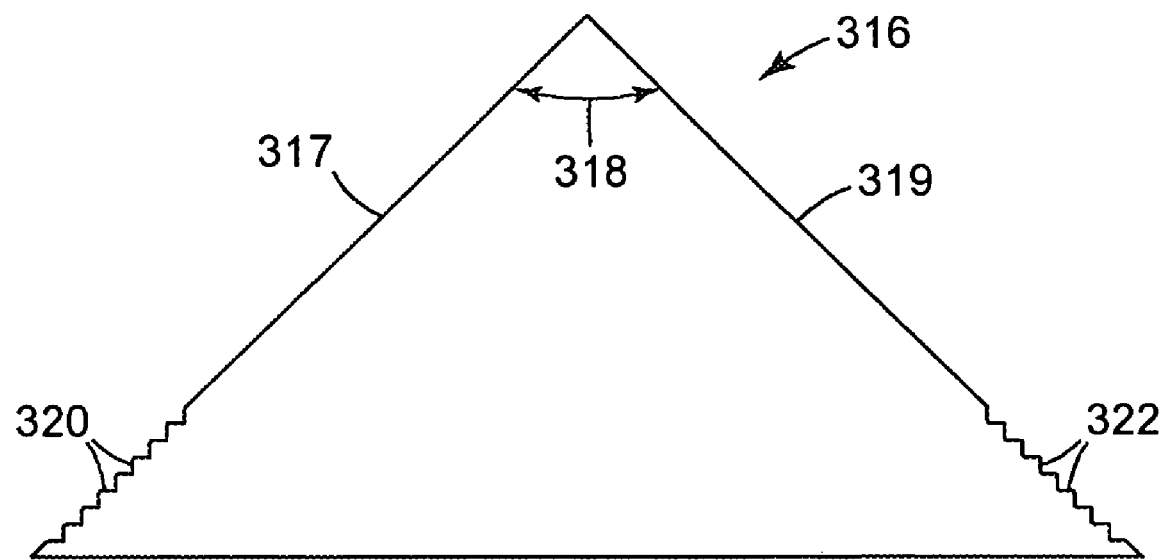
FIG. 16 is a side view of a tool tip with diffractive features along 90° facet sides.

FIG. 16 is a side view of a tool tip 316 with diffractive features 320 and 322 along 90° (318) facet sides 317 and 319. Diffractive features 320 and 322 can be near the tip or near the valley (away from the tip) as appropriate to the design or as desired. Also, the diffractive features 320 and 322 can be located arbitrarily along the 90° facet walls.

Figure 17:
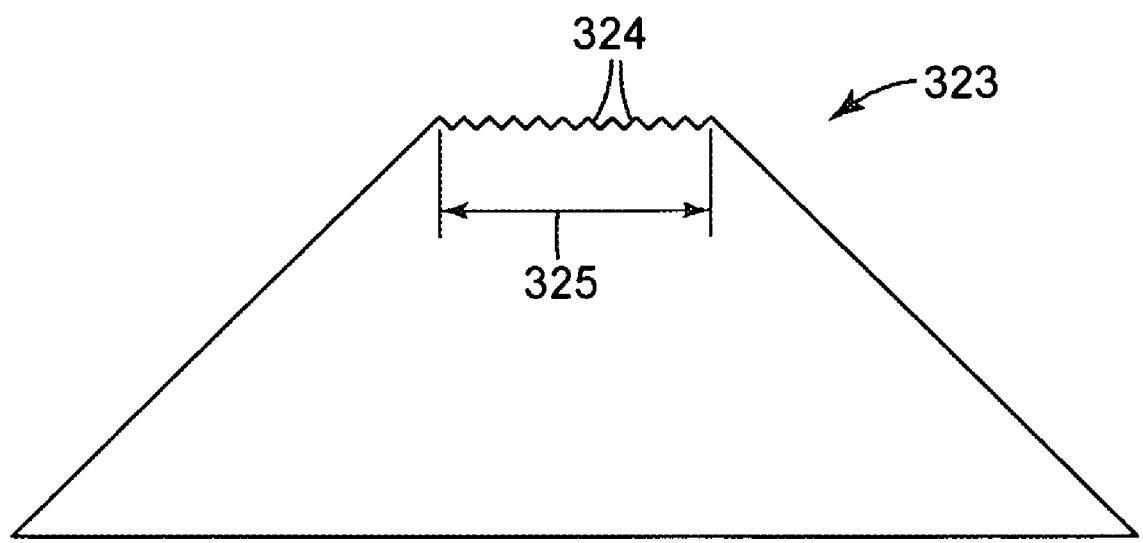
FIG. 17 is a side view of a tool tip with diffractive features along a flat tip.

FIG. 17 is a side view of a tool tip 323 with diffractive features 324 along a flat tip 325. In one example, this type of configuration of diffractive features on a tool tip was made from a diamond having a 10 micron width (325) with 11 V-grooves (324) spaced 1 micron apart.

Figure 18:
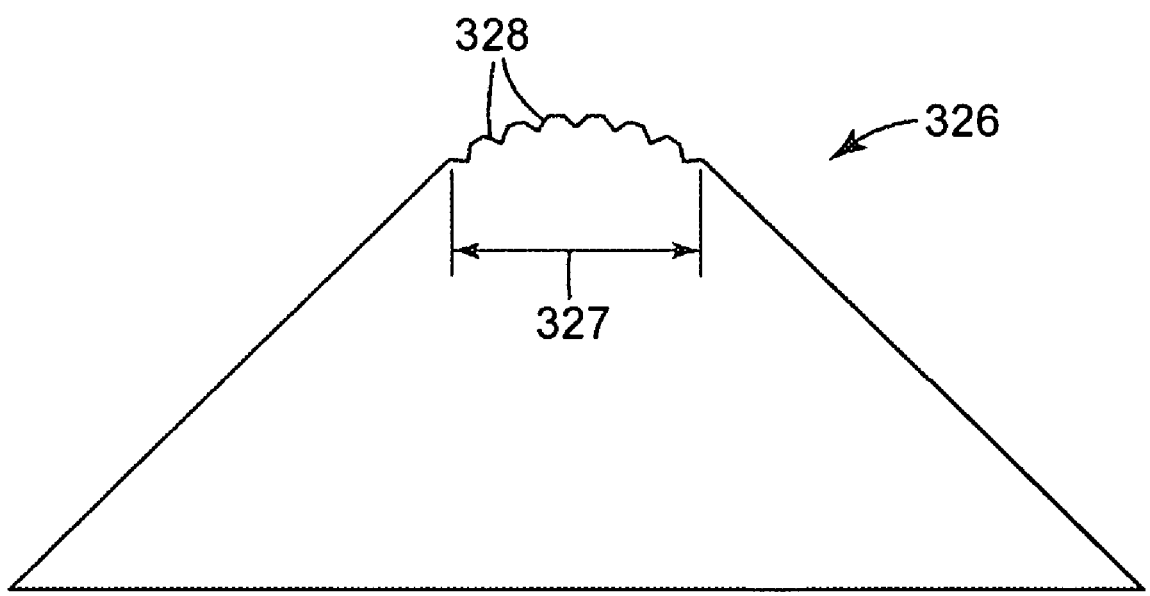
FIG. 18 is a side view of a tool tip with diffractive features along a curved tip.

FIG. 18 is a side view of a tool tip 326 with diffractive features 328 along a curved tip 327.

Figure 19:
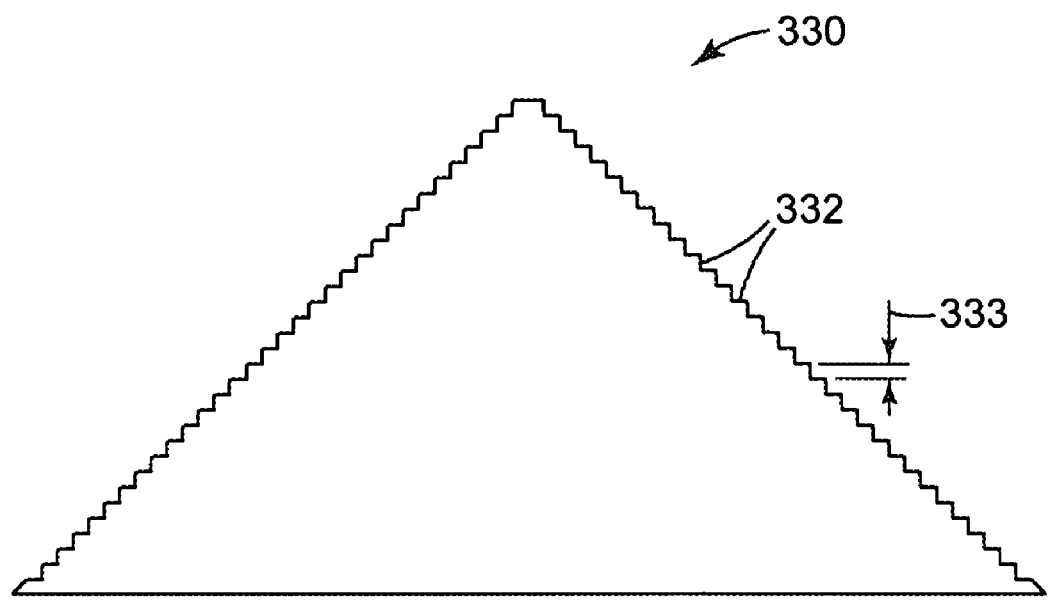
FIG. 19 is a side view of a tool tip with diffractive features formed in steps.

FIG. 19 is a side view of a tool tip 330 with diffractive features 332 formed in steps having a height 333 along 90° facets, for example.

Figure 20:
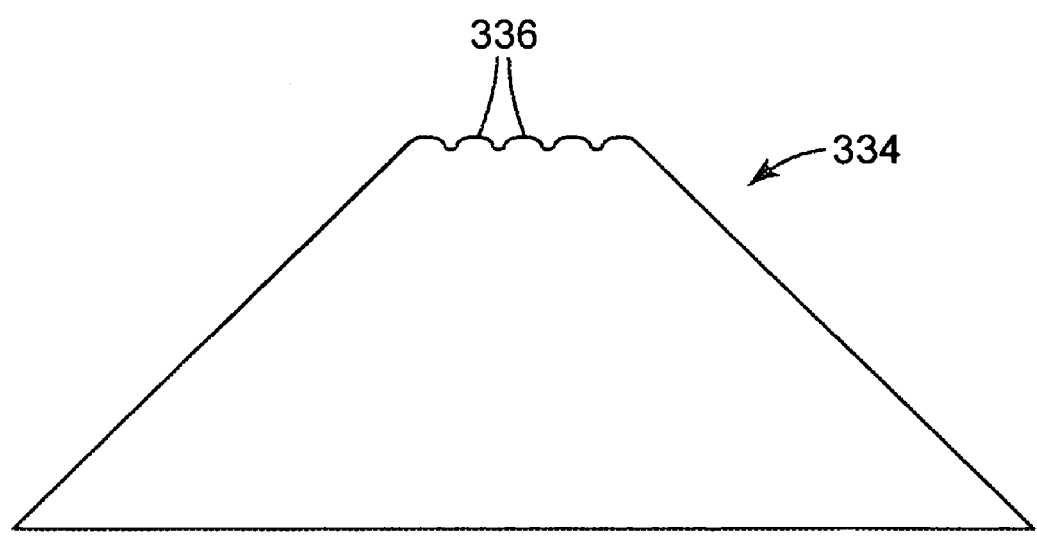
FIG. 20 is a side view of a tool tip with diffractive features having a lenticular shape.

FIG. 20 is a side view of a tool tip 334 with diffractive features 336 having a lenticular shape along a substantially flat portion of the tool tip.

Figure 21:
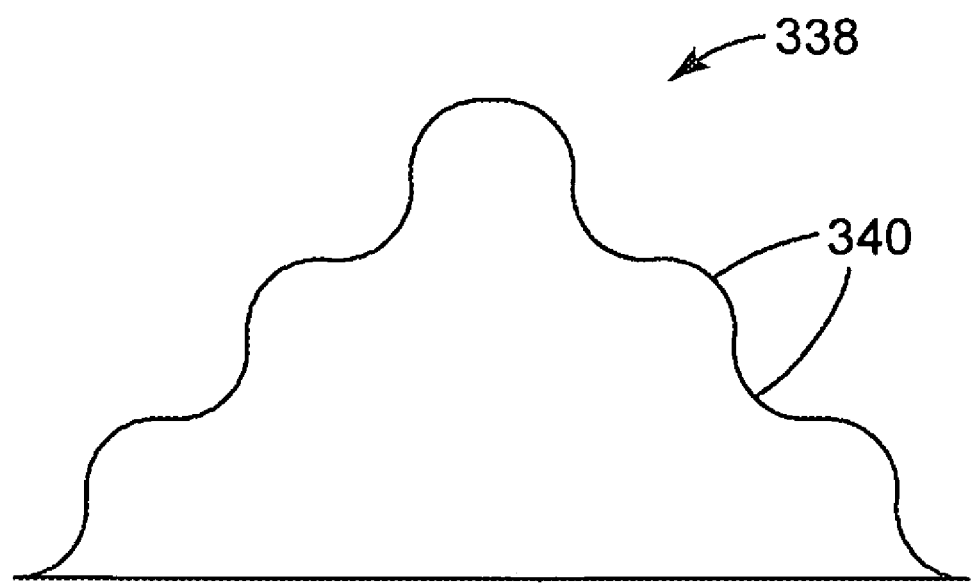
FIG. 21 is a side view of a tool tip with diffractive features along curved facets.

FIG. 21 is a side view of a tool tip 338 with diffractive features along curved facets 340 formed from adjacent concave and convex portions along the facets.

Figure 22:
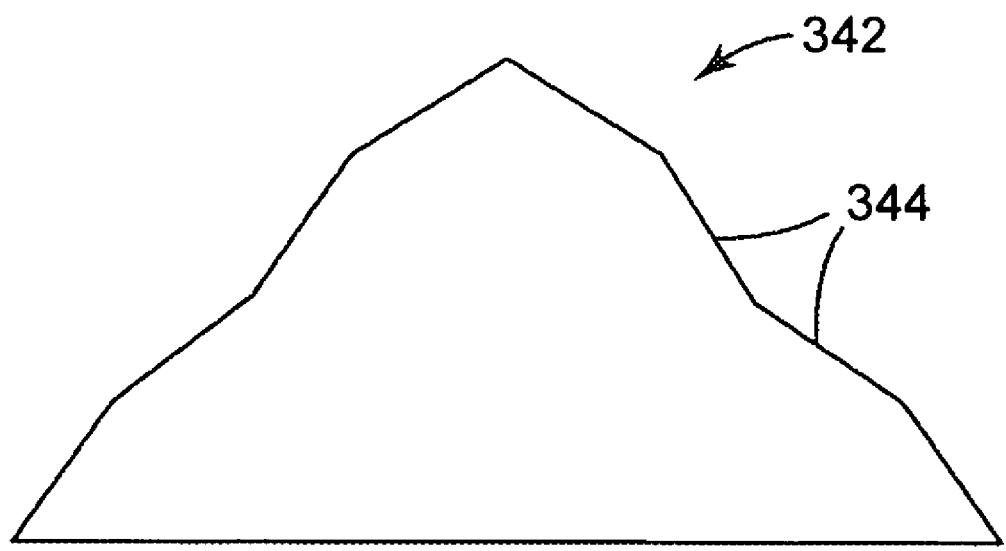
FIG. 22 is a side view of a tool tip with diffractive features along multiple linear facets.

FIG. 22 is a side view of a tool tip 342 with diffractive features along multiple linear facets 344 formed from adjacent angular flat portions along the facets.

Figure 23A:
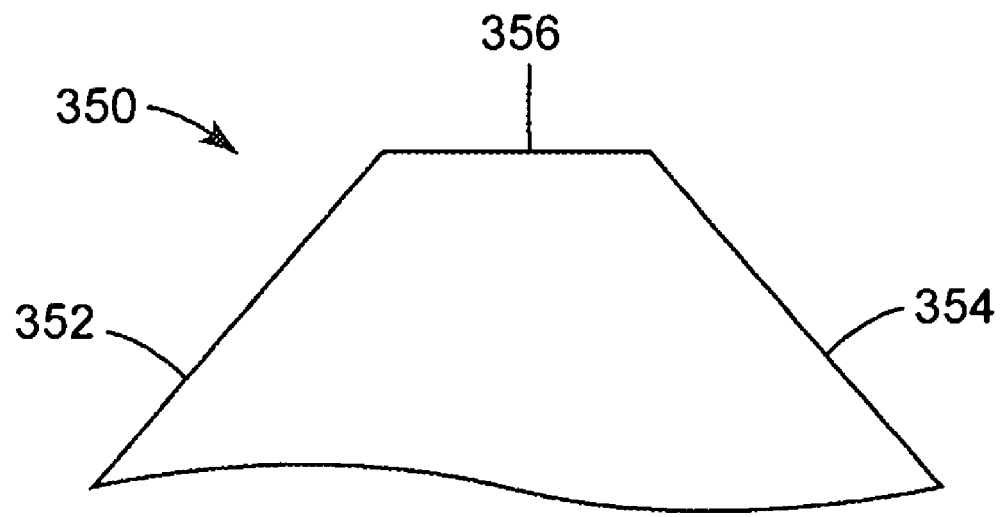
FIG. 23A is a side view of a tool tip before ion milling.
Figure 23B:
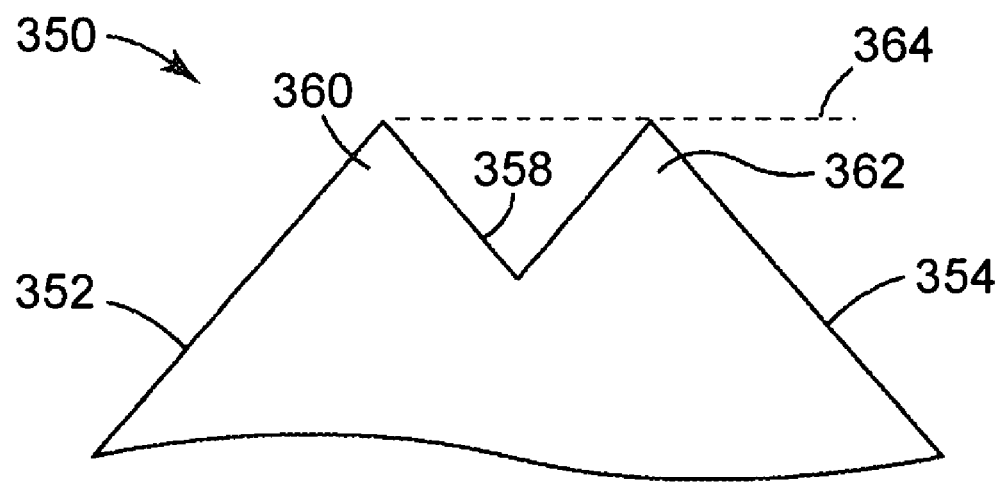
FIG. 23B is a side view of the tool tip of FIG. 23A after using ion milling to form diffractive features in the same plane on the tip.

FIGS. 23A and 23B illustrate a method of ion milling a tool tip to create diffractive features. FIG. 23A is a side view of a tool tip 350 before ion milling. Tool tip 350 can be implemented with a diamond slab, for example, and it has facets 352 and 354, and a flat tip 356. FIG. 23B is a side view of tool tip 350 after using ion milling to form diffractive features in the same plane on the tip. In particular, ion milling of the flat tip 356 at its center point produces a valley 358 to create two diffractive features 360 and 362 having points lying in substantially the same plane 364.

Figure 24A:
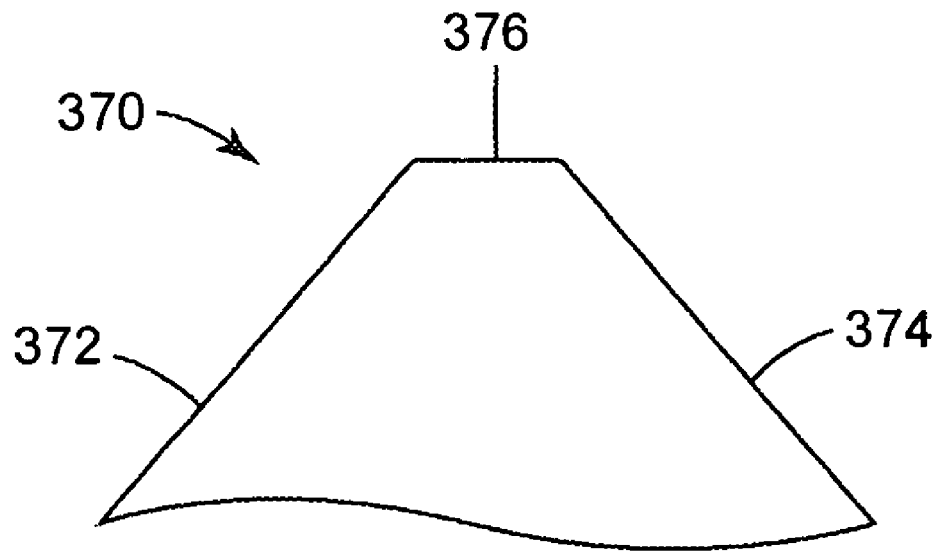
FIG. 24A is a side view of a tool tip before ion milling.
Figure 24B:
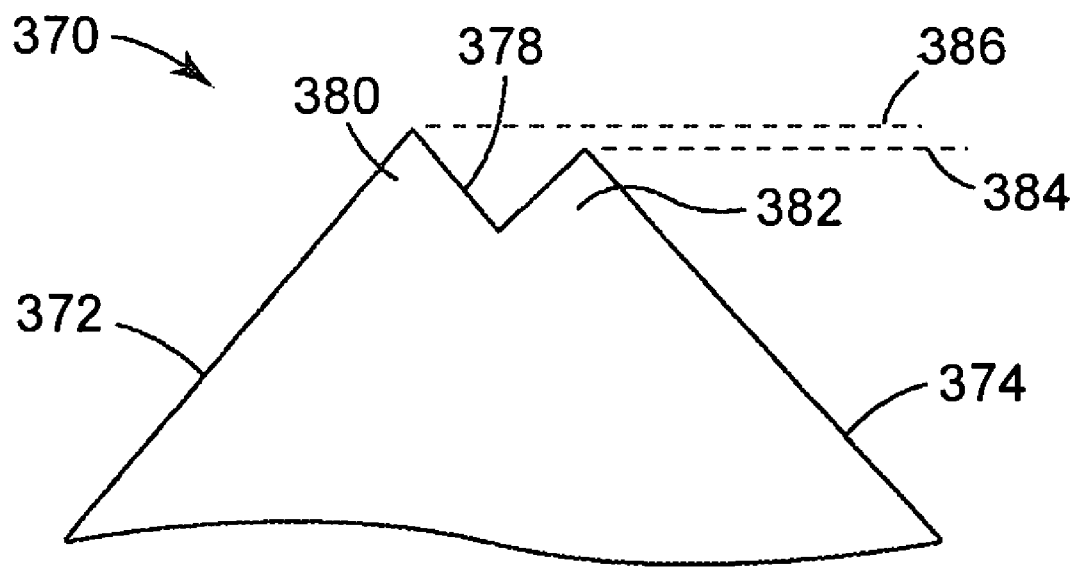
FIG. 24B is a side view of the tool tip of FIG. 24A after using ion milling to form diffractive features in different planes on the tip.

FIGS. 24A and 24B illustrate another method of ion milling a tool tip to create diffractive features. FIG. 24A is a side view of a tool tip 370 before ion milling. Tool tip 370 can be implemented with a diamond slab, for example, and it has facets 372 and 374, and a flat tip 376. FIG. 24B is a side view of the tool tip of FIG. 24A after using ion milling to form diffractive features in different planes on the tip. In particular, ion milling of the flat tip 376 at an off-center point produces a valley 378 to create a first diffractive feature 380 having a point lying in a plane 386 and a second diffractive feature 382 having a point lying in a plane 384 different from plane 386. The process to make the diffractive features shown in FIGS. 23B and 24B can be repeated to make several diffractive features on the tool tip, and the features shown in FIGS. 23B and 24B are not shown to scale; rather, they are intended to illustrate processes for making diffractive features on tool tips.

The use of tool tips with diffractive features as described above to make microreplicated articles, such as films, can provide for many advantageous or desirable features. For example, they can be used in light management applications for light direction, softening cutoff angles, extraction of light for light guides, or decorative effects on existing features such as rainbow effects on interrupted cut lenslets. Also, a diffractive feature on a larger microstructure provides for an additional degree of freedom for redirecting light.

The tool tips described above can be used to make features on a macro-scale (dimensions of 1 micron and above) and a nano-scale (dimensions less than 1 micron), and the features can be made using one or more tool tips in a continuous or interrupted cut mode. In addition, the cutting using the tool tips can be accomplished in an x-direction, a y-direction, or a z-direction into the tool, or a combination of those directions. For example, the features can be cut using the tool tip with multiple actuators. Systems to use multiple actuators for cutting a tool are described in U.S. patent application Ser. Nos.

11/274,723, 11/273,875, 11/273,981, and 11/273,884, all of which were filed Nov. 15, 2005 and all of which are incorporated herein by reference. Alternatively, the diffractive features can be cut in the tool without use of an actuator, which can involve continuous cutting with the tool tip(s) held at a substantially constant or a non-constant depth in the surface of the tool using, for example, a low frequency servo.

While the present invention has been described in connection with an exemplary embodiment, it will be understood that many modifications will be readily apparent to those skilled in the art, and this application is intended to cover any adaptations or variations thereof. For example, various types of materials for the tool post, actuator, and tool tip, and configurations of those components, may be used without departing from the scope of the invention. This invention should be limited only by the claims and equivalents thereof.

What is claimed is:

1. An optical film, comprising:
    a substantially transparent substrate having a first surface and a second surface opposite the first surface; and
    a plurality of diffractive features in the first surface of the substrate, wherein the diffractive features cause diffraction of light passing through the substrate,
    wherein the plurality of diffractive features includes a repeating set of diffractive features with a substantially constant distance between the features in the set and a randomly repeating variable distance between the sets of the diffractive features, wherein the diffractive features comprise grooves.

2. The optical film of claim 1, wherein the randomly repeating variable distance is equal to approximately 0.2 microns.

* * * * *